United States Patent
Hamid

(10) Patent No.: US 11,341,185 B1
(45) Date of Patent: May 24, 2022

(54) SYSTEMS AND METHODS FOR CONTENT-BASED INDEXING OF VIDEOS AT WEB-SCALE

(71) Applicant: Amazon Technologies, Inc., Seattle, WA (US)

(72) Inventor: Muhammad Raffay Hamid, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 16/386,992

(22) Filed: Apr. 17, 2019

Related U.S. Application Data

(60) Provisional application No. 62/686,973, filed on Jun. 19, 2018.

(51) Int. Cl.
| | |
|---|---|
| G06F 16/71 | (2019.01) |
| G06F 16/783 | (2019.01) |
| G10L 25/57 | (2013.01) |
| G06V 20/40 | (2022.01) |
| G06K 9/62 | (2022.01) |

(52) U.S. Cl.
CPC .......... G06F 16/71 (2019.01); G06F 16/7834 (2019.01); G06V 20/46 (2022.01); G10L 25/57 (2013.01); *G06K 9/622* (2013.01); *G06K 9/6259* (2013.01)

(58) Field of Classification Search
CPC ..... G06F 16/71; G06F 16/7834; G10L 25/57; G06K 9/00744; G06K 9/622; G06K 9/6259
USPC ........................................................ 707/737
See application file for complete search history.

(56) References Cited

U.S. PATENT DOCUMENTS

| | | | | |
|---|---|---|---|---|
| 5,182,773 A | * | 1/1993 | Bahl | G10L 19/038 704/222 |
| 6,347,313 B1 | * | 2/2002 | Ma | G06K 9/6253 707/711 |
| 7,734,097 B1 | * | 6/2010 | Porikli | G06K 9/522 382/190 |

(Continued)

FOREIGN PATENT DOCUMENTS

WO WO-2019136811 A1 * 7/2019 ............. G10L 25/51

OTHER PUBLICATIONS

Anderson E., et al., "LAPACK Users' guide," SIAM, Third Edition, Retrieved from http://www.netlib.org/lapack/lug/lapack_lug.html, Aug. 22, 1999, 577 pages.

(Continued)

*Primary Examiner* — Loi H Tran
(74) *Attorney, Agent, or Firm* — Nicholson De Vos Webster & Elliott LLP

(57) ABSTRACT

Techniques for content-based indexing of videos at web-scale are described. As one example, a computer-implemented method includes receiving a video file, splitting the video file into video frames and audio for the video frames, determining audial features for the audio, clustering each of a plurality of subsets of the audial features into a respective audio centroid for a shared set of bases, determining a first adjacency matrix of distances between the respective audio centroids, determining visual features for the video frames, clustering each of a plurality of subsets of the visual features into a respective video centroid, and determining a second adjacency matrix of distances between the respective video centroids.

20 Claims, 11 Drawing Sheets

(56) References Cited

U.S. PATENT DOCUMENTS

| | | | |
|---|---|---|---|
| 8,600,718 B1* | 12/2013 | Stepaniants | G16B 20/20 703/11 |
| 2011/0222787 A1* | 9/2011 | Thiemert | G06F 16/785 382/225 |
| 2012/0321282 A1* | 12/2012 | Konuma | H04N 21/4394 386/241 |
| 2014/0328570 A1* | 11/2014 | Cheng | H04N 21/44008 386/241 |
| 2015/0066507 A1* | 3/2015 | Nakamura | G10L 15/142 704/240 |
| 2015/0117703 A1* | 4/2015 | Peng | G06K 9/00718 382/103 |
| 2018/0349477 A1* | 12/2018 | Jaech | G06F 16/9535 |
| 2019/0027188 A1* | 1/2019 | Akolkar | G11B 27/10 |
| 2019/0080001 A1* | 3/2019 | Tylenda | G06F 16/93 |
| 2019/0205649 A1* | 7/2019 | Ananthanarayanan | G06K 9/6256 |
| 2019/0272308 A1* | 9/2019 | Doi | G06F 17/16 |

OTHER PUBLICATIONS

Anwar S., et al., "Fixed Point Optimization of Deep Convolutional Neural Networks for Object Recognition," In Acoustics, Speech and Signal Processing (ICASSP), IEEE, 2015, pp. 1131-1135.

Ba L. J., "Do Deep Nets Really Need to be Deep?," In Advances in Neural Information Processing Systems, Retrieved from https://arxiv.org/abs/1312.6184v7, Oct. 11, 2014, 10 pages.

Canny J., "A Computational Approach to Edge Detection," IEEE Transactions on Pattern Analysis and Machine Intelligence, vol. PAMI-8, No. 6, Nov. 1986, pp. 679-698.

Chatfield K., et al., "The Devil is in the Details: An Evaluation of Recent Feature Encoding Methods," 2011, pp. 1-12.

Courbariaux M., et al., "Training Deep Neural Networks with Low Precision Multiplications," Workshop Contribution at ICLR, Retrieved from https://arxiv.org/abs/1412.7024, Version 5, Sep. 23, 2015, 10 pages.

Cun Y.L., et al., "Optimal Brain Damage," Advances in neural information processing systems, vol. 2, 1989, 8 pages.

Deng J., et al., "ImageNet: A Large-Scale Hierarchical Image Database," In Computer Vision and Pattern Recognition, IEEE, 2009, pp. 248-255.

Diginmotion, "Running a Website on Amazon EC2," Amazon Web Services, Nov. 11, 2010, retrieved from https://scholar.google.com/scholar?hl=en&as_sdt=0%2C5&q=cloud%2C+a.e.c.+%282011%29+Amazon+web+servies.+Retrieved+November+9%2C+2011&btnG=, 13 pages.

Esser S.K., et al., "Backpropagation for Energy-Efficient Neuromorphic Computing," In Advances in Neural Information Processing Systems, 2015, 9 pages.

Glynn P.W., et al., "Importance Sampling for Stochastic Simulations," Management Science, vol. 35, No. 11, Nov. 1989, pp. 1367-1392.

Golub G.H., et al., "Matrix computations," Fourth Edition, The Johns Hopkins University Press, 2013, 780 pages.

Golub G.H., et al., "Matrix computations," Third Edition, The Johns Hopkins University Press, 1996, 723 pages.

Gong Y., et al., "Compressing Deep Convolutional Networks Using Vector Quantization," Version 1, Retrieved from https://arxiv.org/abs/1412.6115, Dec. 18, 2014, 10 pages.

Gropp W., et al., "A High-Performance, Portable Implementation of the MPI Message Passing Interface Standard," Parallel Computing, vol. 22, No. 6, 1996, pp. 789-828.

Hamid R., et al., "Compact Random Feature Maps," Proceedings of the 31st International Conference on Machine Learning, vol. 32, 2014, pp. 19-27.

Hanson S.J., et al., "Comparing Biases for Minimal Network Construction with Back-Propagation," Advances in Neural Information Processing Systems, 1989, pp. 177-185.

Hartigan J.A., et al., "A K-Means Clustering Algorithm," Journal of the Royal Statistical Society, Series C (Applied Statistics), vol. 28, No. 1, 1979, pp. 100-108.

He K., et al., "Deep Residual Learning for Image Recognition," In Proceedings of the IEEE Conference on Computer Vision and Pattern Recognition, Retrieved from https://arxiv.org/abs/1512.03385, Dec. 10, 2015, pp. 770-778.

He Z., "Approximation Algorithms for K-Modes Clustering," Proceedings of the International conference on Intelligent Computing, Retrieved from https://arxiv.org/ftp/cs/papers/0603/0603120.pdf, 2006, 7 pages.

Hosang J., et al., "How Good are Detection Proposals, Really?," Retrieved from https://arxiv.org/abs/1406.6962v1, Version 1, Jun. 26, 2014, pp. 1-24.

Hu W., et al., "A Survey on Visual Content—Based Video Indexing and Retrieval," IEEE Transactions on Systems, Man and Cybernetics, Part C—Applications and Reviews, vol. 41, No. 6, Nov. 2011, pp. 797-819.

Hwang K., et al., "Fixed-Point Feedforward Deep Neural Network Design Using Weights +1, 0, and -1," IEEE Signal Processing Systems, 2014, pp. 1-6.

Jacobs J., et al., "Is Sports Sponsorship Worth it?," McKinsey Annual Report, McKinsey on Marketing & Sales, Jun. 2014, 3 pages.

Jacobsen E., et al., "The Sliding DFT," IEEE Signal Processing Magazine, vol. 20, No. 2, Mar. 2003, pp. 74-80.

Jiang L., et al., "Bridging the Ultimate Semantic Gap: A Semantic Search Engine for Internet Videos," Proceedings of the 5th ACM on International Conference on Multimedia Retrieval (ICMR '15), Jun. 23-26, 2015, pp. 27-34.

Jiang L., et al., "Fast and Accurate Content-based Semantic Search in 100M Internet Videos," Proceedings of the 23rd ACM international conference on Multimedia, Oct. 26-30, 2015, 10 pages.

Krizhevsky A., et al., "ImageNet Classification with Deep Convolutional Neural Networks," In Advances in Neural Information Processing Systems, 2012, 9 pages.

Kuang D., et al., "Hardware Compliant Approximate Image Codes," In Proceedings of the IEEE Conference on Computer Vision and Pattern Recognition (CVPR), 2015, pp. 924-932.

Kuang D., et al., "piCholesky: Polynomial Interpolation of Multiple Cholesky Factors for Efficient Approximate Cross-Validation," Retrieved from https://arxiv.org/abs/1404.0466v1, Version. 1, 2014, 9 pages.

Liang J., et al., "Detecting Semantic Concepts In Consumer Videos Using Audio," IEEE International Conference on Acoustics, Speech and Signal Processing (ICASSP), 2015, pp. 2279-2283.

Lin Z., et al., "Neural Networks with Few Multiplications," Retrieved from https://arxiv.org/abs/1510.03009v1, Version 1, 2015, 7 pages.

Mermelstein P., "Distance Measures for Speech Recognition—Psychological and Instrumental," Pattern recognition and artificial intelligence, 1976, pp. 91-103.

Metze F., et al., "Improved Audio Features for Large-Scale Multimedia Event Detection," IEEE International Conference on Multimedia and Expo (ICME), 2014, pp. 1-6.

Meyer C.D., "Matrix Analysis and Applied Linear Algebra," Society for Industrial and Applied Mathematics (SIAM), 2000, 890 pages.

Pancoast S., et al., "Bag-of-Audio-Words Approach for Multimedia Event Classification," Interspeech 2012, ISCA's 13th Annual Conference, Sep. 9-13, 2012, pp. 2105-2108.

Proakis J.G., et al., "Communication Systems Engineering," Second Edition, Pearson Education International, 1994, 410 pages.

PWC, "Changing the game—Outlook for the Global Sports market to 2015," Dec. 2011, 40 pages.

Rahimi A., et al., "Random Features for Large-Scale Kernel Machines," Proceedings of the 20th International Conference on Neural Information Processing Systems, 2007, pp. 1-8.

Rahimi A., et al., "Weighted Sums of Random Kitchen Sinks: Replacing Minimization with Randomization in Learning," Advances in Neural Information Processing Systems, 2008, 8 pages.

Rastegari M., et al., "XNOR-Net: ImageNet Classification Using Binary Convolutional Neural Networks," Retrieved from arXiv:1603.05279v1, Version 1, 2016, 17 pages.

(56) References Cited

OTHER PUBLICATIONS

Redmon J., et al., "You Only Look Once: Unified, Real-Time Object Detection," Proceedings of the IEEE Conference on Computer Vision and Pattern Recognition, 2016, pp. 779-788.
Sivic J., et al., "Efficient Visual Search of Videos Cast as Text Retrieval," IEEE Transactions on Pattern Anaalysis and Machine Iintelligence. Vol. 31(4), Apr. 2009, pp. 591-606.
Soudry D., et al., "Expectation Backpropagation: Parameter-Free Training of Multilayer Neural Networks with Continuous or Discrete Weights," In Advances in Neural Information Processing Systems, 2014, 9 pages.
Takahashi N., et al., "AENet: Learning Deep Audio Features for Video Analysis," Retrieved from https://arxiv.org/abs/1701.00599, Version 2, Jan. 4, 2017, 12 pages.
Takahashi N., et al., "Deep Convolutional Neural Networks and Data Augmentation for Acoustic Event Detection," Retrieved from https://arxiv.org/abs/1604.07160v2, Version 2, Dec. 8, 2016, 5 pages.
Tropp J.A., "Improved Analysis of the Subsampled Randomized Hadamard Transform," Advances in Adaptive Data Analysis, Retrieved from https://arxiv.org/abs/1011.1595, Jul. 17, 2011, vol. 3, 8 pages.
Vanhoucke V., et al., "Improving the speed of neural networks on CPUs," In Proceedings of the Deep Learning and Unsupervised Feature Learning NIPS Workshop, vol. 1, 2011, p. 4 (8 pages).
Voorhees E.M., et al., "TREC: Experiment and Evaluation in Information Retrieval," Computational Linguistics, MIT press Cambridge, vol. 32, No. 4, 2005, pp. 563-567.
Wang J., et al., "Locality-Constrained Linear Coding for Image Classification," IEEE Conference on Computer Vision and Pattern Recognition, 2010, 8 pages.
Wichern G., et al., "Segmentation, Indexing, and Retrieval for Environmental and Natural Sounds," IEEE Transactions on Audio, Speech, and Language Processing, vol. 18, No. 3, Mar. 2010, pp. 688-707.
Xia Y., et al., "Sparse Projections for High-Dimensional Binary Codes," IEEE Conference on Computer Vision and Pattern Recognition, 2015, pp. 3332-3339.
Xue J., et al., "Fast Query by Example of Environmental Sounds Via Robust and Efficient Cluster-Based Indexing," IEEE ICASSP, 2008, pp. 5-8.
Young I., "Image Analysis and Mathematical Morphology, by J. Serra. Academic Press, London, 1982, xviii + 610 p," Article in Cytometry, Book Review, vol. 4, Spe. 1983, pp. 184-185.
Zhang H.J., et al., "An Integrated System for Content-Based Video Retrieval and Browsing," Pattern recognition, vol. 30, No. 4, 1997, pp. 643-658.

* cited by examiner

FIG. 4A VIDEO FRAME 400
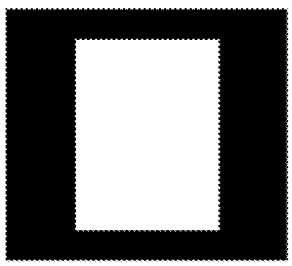
FIG. 4B EDGE MAP 402
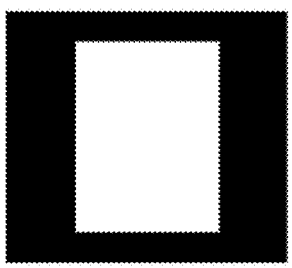
FIG. 4C ROW/COLUMN-SUM FACTORS 404
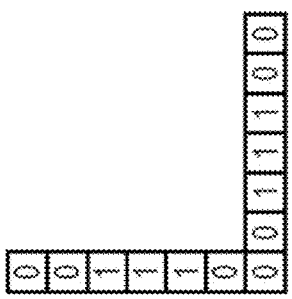
FIG. 4D SUM VECTORS' OUTER PRODUCT 406
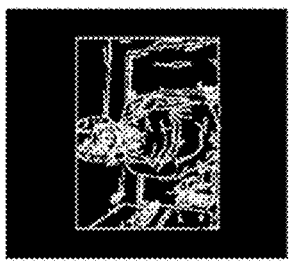
FIG. 4E EROSION OUTPUT 408
FIG. 4F FRAME BORDER REMOVAL OUTPUT 410

SYSTEMS AND METHODS FOR CONTENT-BASED INDEXING OF VIDEOS AT WEB-SCALE

CROSS-REFERENCE TO RELATED APPLICATIONS

This application claims the benefit of U.S. Provisional Application No. 62/686,973, filed Jun. 19, 2018, which is incorporated herein by reference in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which:

FIGS. 4A-4F illustrate border removal of a frame of a video according to some embodiments.

DETAILED DESCRIPTION

Figure 1:
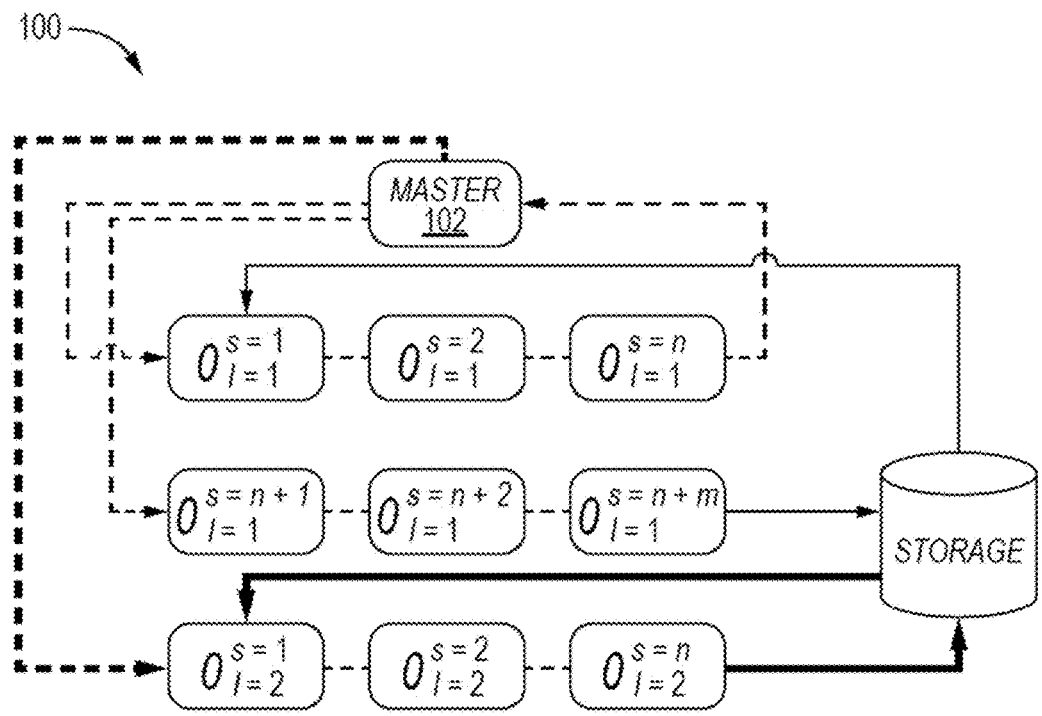
FIG. 1 is a diagram illustrating a computation framework for content indexing according to some embodiments.

Various embodiments of methods, apparatus, systems, and non-transitory computer-readable storage media for content-based indexing of videos in a scalable manner are described. According to some embodiments, content-based indexing disclosed herein uses clustering of features and binarization of features to remove the content and numerical redundancies present in large-scale data-sets. Embodiments herein provide novel systems and methods that use one or both of the two approaches to provide an indexing scheme for a specific large-scale context that balances search accuracy, search speed, and index size.

Certain embodiments herein provide for a system and method for automatic content-based indexing of videos in a scalable manner Such a system and method may make contributions from three key perspectives. First, as an efficient compute platform that (i) is streaming in nature, (ii) capable of maximally exploiting distributed heterogeneous compute architectures, and (iii) dynamically adjusts workloads based on the availability of (e.g., low-cost) spot-instances on a provider network (e.g., cloud) in a robust manner. Second, by offering multimedia indexing and search solutions while optimizing factors such as (i) accuracy, (ii) speed, and (iii) memory foot-print of the index. Embodiments of this framework make two important contributions regarding feature extraction that play a key role for efficient large-scale media indexing, (i) for visual features, a deep convolution network approximation may be used to significantly reduce the computational cost of deep feature extraction with minimal accuracy loss, and (ii) for auditory analysis, the framework may compute the audio spectra of the video-corpus followed by their dictionary-based locality-constrained approximate representation (e.g., that is up to 40 time as efficient as its exact counter-part while offering comparable encoding accuracy). Third, the framework offers an active learning framework to enable efficient label acquisition which can be used for feature learning to improve the indexing accuracy. The disclosed framework may be used for numerous applications for videos on social media, including automatic (i) video search (holistic and by-parts), (ii) video tagging, (iii) and video discovery. Furthermore, to show the generalizability of the framework, it may be used to perform automatic brand-logo recognition in sports videos for the application of sports sponsorship valuation.

1. INTRODUCTION

Automatic video indexing is emerging as an important area with multiple business use cases. Certain embodiments herein provide a novel system and method to index videos based on their audial and/or visual content.

1.1 Key Engineering Challenges

Large-scale multi-media indexing generally requires significant data processing and substantial computational resources. It may be desirable to use provider network (e.g., cloud computing) services to meet these needs. However, given the large-scale and high-resource requirements of large-scale multi-media indexing, these services can come at a steep monetary cost. Some key factors that contribute to the high costs for provider network based multi-media processing are: network latency, compute inefficiencies, and a high flop cost. To address these challenges, certain embodiments herein provide a computational framework that offers the following three key characteristics. First, embodiments of the framework perform processing in a streaming manner in order to overcome the network latency both from data-download as well as feature upload perspectives. Network latency can be a significant challenge in terms of: incurring additional costs for keeping expensive compute-nodes waiting without processing while data and features are moved from and to (e.g., cloud) storage, and requiring large (e.g., expensive) storage local to compute nodes that can keep the intermediate features throughout the lifespan of a compute job. Second, embodiment of the framework are capable of maximally exploiting heterogeneous compute architectures with multi-core central processing units (CPUs) and graphics processing units (GPUs) available on a particular node simultaneously. Certain multimedia compute jobs are multi-step in nature where the output of one step gets fed as the input to the next. In certain embodiments, the compute requirements for these various steps are not the same, and therefore some of these steps may be better suited to be run on GPUs while others on CPUs. Since some modern compute architectures provide both GPUs and CPUs in single nodes, processing the various steps involved in a workload on GPUs and CPUs in parallel can lead to significant improvement in the throughput. Third, to minimize provider network (e.g., cloud) compute cost, embodiments of the framework dynamically adjust processing work-loads based on the availability of (e.g., low-cost) spot-instances on the provider network in a robust manner A challenge with using spot-instances on the provider network is that they may be terminated at any point in time, e.g., with only a short warning. Therefore, naively running large-scale jobs on spot-instances could result in failure if the node gets terminated while the job is being processed. Embodiments of the framework maintain the state of each active spot-instance, and in case of the termination of a proper subset of spot-instances, dynamically updates the workloads assigned to all the remaining spot-instances. The aforementioned three characteristics enable an embodiment of the framework to process multi-media at a significantly cheaper cost than without using spot-instances.

An additional challenge for executing large-scale multi-media processing jobs may be the difficulty in defining the data flow as well as resource distribution to the various steps involved in a particular workload, e.g., with a programmer re-writing a substantial amount of enabling code to properly define workloads that can be executed in high-performance settings. To address this challenge, embodiments of the framework disclosed herein provide a standardized methodology to define workloads that can be scaled to hundreds of machines on the provider network if needed to help a programmer improve their efficiency while writing the code to process a vast variety of multimedia processing jobs.

1.2 Scalability and Efficiency

Certain embodiments herein allow for scaling-up to billions of data-points, e.g., by providing a solution to the increase in data variance with an increase in data-size. Those embodiments achieve efficiency and scalability while considering three important factors: search accuracy, search speed, and index size. Each problem setting offers unique dynamics among these three factors, and therefore the indexing solution for each problem setting is to find the right balance among them. The two main ways in which the systems and methods herein enable achieving the right balance among these factors for each particular setting include feature clustering, and feature binarization. Feature clustering and binarization approaches provide a way to remove the content and numerical redundancies present in large-scale data-sets. Certain embodiments herein provide for efficient systems and methods to use any combination of these two approaches to help find the most efficient indexing scheme for a specific large-scale context.

1.3 Deep Feature Approximation

A deep network may offer greatly improved visual discrimination but require high computational and memory costs. To overcome this challenge, certain embodiments herein focus on reducing the compute requirements. Certain embodiments herein provide for model compression, where an alternate shallow (or less-deep) network is trained to approximate the feature space of the deep network. In one embodiment, a model compression approach requires a multi-pass training which can itself be a substantial challenge given the large data-sizes and high data-dimensionality of target deep models. In contrast, certain embodiments herein utilize a randomized approximate kernel projection to learn the target feature space in a single-pass over the data. Certain embodiments herein provide for an entire approximation approach that can be formalized using computational matrix algebra, and can therefore maximally exploit the (e.g., multi-core) processing power of matrix specific processing hardware. Furthermore, by requiring minimal communication among mappers, certain embodiments herein are well-suited for map-reduce based settings. Embodiments herein may thus be substantially cost-effective where large set of images or videos are to have their features extracted using a pre-trained deep convolutional network.

1.4 Auditory Content Encoding

Certain embodiments herein encode the auditory characteristics (e.g., features) of videos in a manner that is different from previously proposed approaches. In one embodiment, audio analysis methods rely on using some variant of mel-frequency cepstral coefficients (MFCC) features, which may be suitable for speech recognition and not for general purpose audio analysis. Certain embodiments herein instead utilize feature-space locality information. Certain embodiments herein do not use (e.g., require) labeled data-sets. Certain embodiments herein use a locally-linear encoding for the auditory signals of the video corpus, e.g., that is significantly more discriminative than other approaches and is geared towards unsupervised settings. Certain embodiments herein provide for an approximate version of an audio-encoding scheme which can be up to 40× faster while being virtually as accurate.

1.5 Efficient Label Acquisition

Labels may be a key component to learn feature space that supports accurate media indexing. However, acquiring labels can be a time-consuming and expensive process. Two key reasons that may cause a high cost of label acquisition are: (a) large data-size and (b) high amount of content redundancy. Certain embodiments herein offer a solution for these two challenges by (a) using automatic clustering to maximally remove the content redundancy, and (b) by organizing the discovered clusters according to their content in order to enable (e.g., a human) to discard large numbers of irrelevant clusters (e.g., by just a few mouse clicks). In one embodiment, a framework disclosed herein use only one label for each cluster and uses label propagation to distribute these labels among the members of the respective clusters. This approach for labelling can help reduce the manual labor required for label acquisition by up to a factor of 1000.

2. EXAMPLE COMPUTATIONAL FRAMEWORK

FIG. 1 is a diagram illustrating a computation framework 100 for content indexing according to some embodiments. The next section defines various terminologies in reference to framework 100.

2.1 Terminologies

In the depicted embodiment, the master block 102 is the main program where the user defines the types of processing that is to be performed in a compute job. Furthermore, O is used in the depicted embodiment to denote a particular operation such that each operation can have multiple steps denoted as s. Different steps in an operation are arranged in the depicted embodiment such that the output of one is used as the input of the next. Different steps in an operation can all run in parallel. In one embodiment, a subset of steps in an operation can be initiated only when a different subset of steps has successfully completed. In the depicted embodiment, a lane (denoted as l) is the set of operations that are completely self-contained such that operations from different lanes do not directly share any data and have no dependencies. Generally, in the depicted embodiment, the starting step of the operations in a particular lane downloads (e.g., for remote storage) or reads (e.g., for local storage) data in a streaming manner. Similarly, in the depicted embodiment, the last step of the operations in a particular lane uploads (e.g., for remote storage) or writes (for local storage) the extracted information in a streaming manner Solid arrows may represent data inputs and outputs while the dotted arrows represent the instruction and data-flow within the purview of the program.

2.2 An Illustrative Example

The following discusses an example of a multimedia processing job with multiple operations to be executed each constituting of multiple steps in reference to FIG. 1. Suppose that given a large corpus of videos, the tasks are to be able to: find a minimal set of regions in each frame of each video that are likely to contain scene objects, find visual features for each region extracted from video frames, and find audial features for the audio stream of the videos. For this example, assume that the provider network resources (e.g., or hardware virtualization services) are one compute node with one GPU and one 8-core CPU. In one embodiment, there is a strong dependency between tasks (a) and (b) while task (c) is independent of the first two tasks. Therefore, a way to define the execution of these tasks in an embodiment of the framework disclosed herein is by having two lanes, a first lane related to task (a) and (b) a second lane related to task (c).

An example task (a) may include finding an exhaustive set of regions that are likely to contain scene objects, followed by merging these regions based on their mutual overlap. Since these two steps can be optimally performed on the GPU and CPU of a particular compute node respectively, running them in parallel is a way to maximize the throughput of the compute node. The logical conclusion of this argument is that task (b) is to be executed once task (a) has been completed. Finally, as task (c) can be run completely independent of tasks (a) and (b) in this example, it is run it in parallel in the second lane.

2.3 Resource Assignment

As evident from the aforementioned example, the different steps required to complete various operations may best be executed with different types of resources. Defining such resource allocation for each new compute job can be quite cumbersome and time-consuming Certain embodiments herein provides a convenient way to define this resource allocation based on the type of hardware resources at hand and the set of operations to be performed. For instance, in the above example, a user can decide that executing the region proposal and feature extraction are to be assigned to the GPU, 4 of the 8 cores are to be used for visual and audio data download and upload respectively, while the remaining 4 cores are to be used for region merging step. Defining such resource allocation can be done using a framework disclosed herein in a standardized and efficient manner, e.g., helping programmers increase their productivity substantially.

2.4 Dynamic Use of Spot Instances

An important factor that adds to the overall monitory cost incurred when running large jobs on a provider network may be the unit compute cost on the provider network. This is particularly true if the compute node being used is dedicated to a particular job, e.g., it is guaranteed to be available so long as it is not explicitly terminated. Therefore, the benefit of indefinite availability of dedicated nodes comes at the cost of a premium price on certain provider networks. Another type of compute node on a provider network may be a spot node which can cost (e.g., substantially) less than an equally resourceful dedicated node, however spot nodes can get terminated automatically in the middle of a job with very short warning. Therefore, the cost benefit of spot nodes come at the price of potentially being interrupted.

Certain embodiments herein provide a computation framework that runs large-scale compute jobs on multiple spot instance such that even when a proper subset of the spot-instances are terminated, the proportion of work the terminated instances had performed does not get lost, and the remaining part of the workload is dynamically allocated to the spot instances that are still available.

Figure 2:
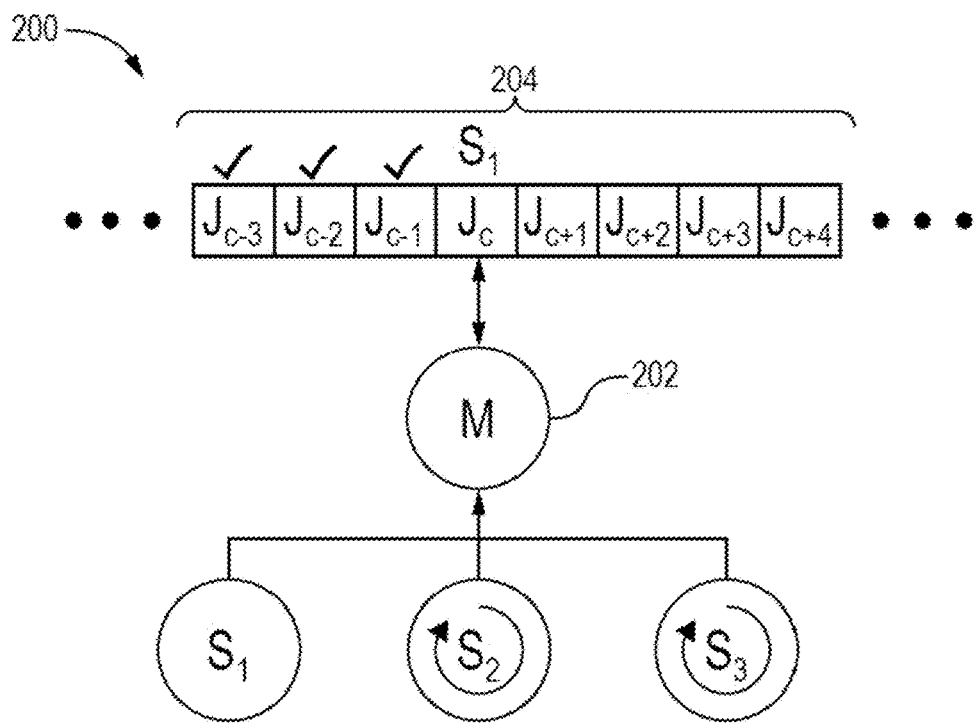
FIG. 2 is a diagram illustrating a spot-instance based distributed computation framework for content indexing according to some embodiments.

FIG. 2 is a diagram illustrating a spot-instance based distributed computation framework 200 for content indexing according to some embodiments. In the depicted embodiment, master node (M) 202 maintains a job-priority-list 204 with multiple jobs ("J") that constitute a particular workload. The figure shows three slave nodes (S) (although any plurality of slave nodes may be utilized) with slave node $S_1$ shown to be currently available to perform a job, while slave nodes $S_2$ and $S_3$ are shown to be busy executing their already assigned jobs. In one embodiment, node Sipings the master node 202 and the master node assigns the current job (Jc) to node $S_1$.

The depicted framework illustrated in FIG. 2 operates in a master-slave manner where the master node M maintains a priority list 204 of a set of jobs that need to be processed. In certain embodiments, the master node 202 is a dedicated instance on the provider network, however it may not need to have high compute resources and may be obtained at minimally low cost. In one embodiment, the master node 202 spins off "P slave nodes each of which is a spot instance. Each node p∈P knows the internet protocol (IP) address of the master node 202 and pings master node 202 as soon as it can to fetch a job from it. In one embodiment, the master node 202 gives out the top job in its jobs priority queue to whichever p∈P as soon as it requests it. Upon the completion of the job, the slave node p∈P updates master node 202, and then marks takes that job as being complete. In certain embodiments, this master-slave set-up where the master node is permanent throughout the course of a workload while the slave nodes can be terminated at any point enables dynamic tracking of the subset of the workload that has been finished.

2.5 Experiments & Results

To show the effectiveness of such a computational framework as disclosed herein, results of an example workload run on a provider network with and without this framework is discussed.

Consider a computational workload where it is required to read a set of frames from provider network storage, extract their visual features using a deep convolutional network, and then write these features to the local drive while uploading the processed frames to the provider network storage. For this workload, a compute node with one GPU and a 4-core CPU may be used in certain embodiments. Table 1 below shows the timings results for each of the various steps needed to be executed for this workload when each step is carried out in a sequential manner

TABLE 1

Clock Timing to Perform Certain Operations with the Framework of FIG. 2

| Operations | Timings (sec.) |
| --- | --- |
| Frame Download | 15 |
| Feature Extraction | 185 |
| Feature Write | 79 |
| Frame Upload | 131 |
| Total Time - Sequential | 401 |
| Total Time - using FIG. 2 Framework | 206 |

Here, the deep convolution network used was ResNet-152 and the deep feature computation was executed on the GPU. Furthermore, in case of using the disclosed framework, each core runs one of the four steps in that workload. It can be observed that for a simple compute workload as considered in this example, the efficiency gains can be as much as two times. In general, the theoretical lower bound on the time taken by a compute job using the disclosed framework is equal to the time taken by the most compute-heavy step in that job. The overall efficiency provided by the disclosed framework is dictated by (a) the distribution of time consumed by each step in a compute job, and (b) how many of these steps can be run in parallel. For compute jobs where each step takes similar time and can be run in parallel, the disclosed framework can offer a multiplicative factor in compute efficiency that is of the order of the number of steps involved in the compute jobs.

3. VIDEO INDEXING

Figure 3:
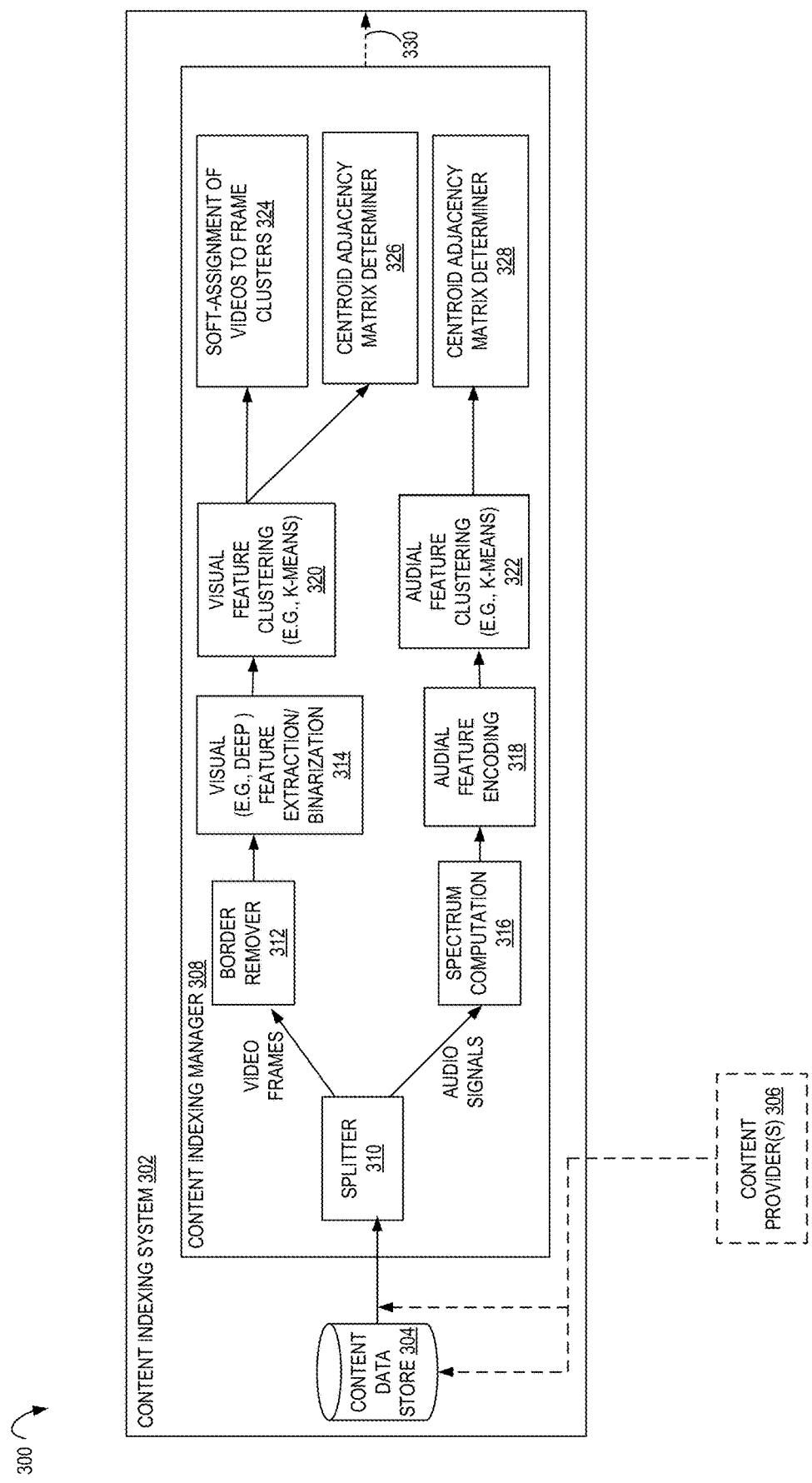
FIG. 3 is a diagram illustrating an environment including a content indexing system to index visual and audial features of a video according to some embodiments.

FIG. 3 is a diagram illustrating an environment 300 including a content indexing system 302 to index visual and audial features of a video (e.g., offline) according to some embodiments. The depicted content indexing system includes a content data store 304, which may be implemented in one or more data centers. Optionally, content provider(s) 306 may be included to provide a video file, for example, directly to the content indexing manager 308 without utilizing the content data store 304 or into storage in content data store 304. A video file (e.g., including a plurality of video frames and the audio corresponding to those video frames) that is to be analyzed for indexing is accessed from the content data store 304 by content indexing manager 308. Depicted content indexing manager 308 includes a splitter 310 to separate out the video (e.g., video frames) and the audio (e.g., audio signal values). In certain embodiments, any of the components may be used and it is not required to use each of them.

In the depicted embodiment, content indexing manager 308 sends the video frames to the border remover 312, the borderless frames are sent to video feature extraction/binarization 314, the video features are sent to visual feature clustering 320 (e.g., to form a cluster of video centroid(s)), and the clustered visual features are sent to centroid adjacency matrix determiner 326 (and optionally, to soft-assignment of videos to frame clusters 324). In the depicted embodiment, content indexing manager 308 sends the audio to spectrum computation 316, the frequency spectra are sent to audial feature encoding 318, the audial features are sent to audial feature clustering 322 (e.g., to form a cluster of audio centroid(s)), and the clustered audial features are sent to centroid adjacency matrix determiner 328. Output port 330 may be used to store the results from content indexing manager 308, e.g., into content data store 304. Content indexing system 302 may be implemented on a provider network (e.g., as discussed below).

3.1 Visual Feature Extraction

The below discusses extracting features of videos.

3.1.1 Pre-Processing—Border Removal:

FIGS. 4A-4F illustrate border removal of a frame of a video according to some embodiments. Border remover 312 in FIG. 3 may include any of the following. In one embodiment, border remover initially computes the edge-map M for each frame f (e.g., the frame 400 with border shown in FIG. 4A) of each video v in a video corpus V by applying an edge detector (e.g., Canny edge detector) to the frame. An example output of an edge detector is depicted in the edge map 402 ("M") in FIG. 4B. In the depicted embodiment, this is followed by finding the row and column-wise sums Sr and Sc of edge map M, $$S_r = \sum_{i=0}^{p} row_i(M) \quad (1)$$

$$S_c = \sum_{j=0}^{q} cols_j(M) \quad (2)$$

e.g., where p and q are the number of rows (r) and columns (c) of frame f, respectively. One example of these sums is shown as row and column sum factors 404 in FIG. 4C. In one embodiment, sums of a column (or row) of an edge map is a value that represents which of the elements of that column (or row) of the edge map include an edge (e.g., include a white pixel). In the depicted embodiment, the outer product of the column and row-vectors Sr and Sc to generate an image I (e.g., matrix) of size p×q (e.g., as shown as sum vectors' outer product 406 in FIG. 4D). Note that each non-zero pixel (i, j) in image I indicates the presence of at least one edge-pixel in the i-th row and j-th column of M. In the depicted embodiment, this is followed by performing a morphological erosion on M to generate an updated M with unimportant edges filtered out (e.g., as shown as erosion output 408 in FIG. 4E). In certain embodiment, a line detection is performed on updated M to determine pairs of any axis-aligned edge-boundaries, and is repeated $\forall f \in v$ followed by generating the smallest rectangle encompassing all axis-aligned detected edge-boundaries in v as the inferred coordinates of the border rectangle for v. This inferred border rectangle is used as a mask to crop off the inferred boarder to generate the output (e.g., frame border removal output 410 in FIG. 4F). The above border removal will remove horizontal, vertical, and even curvilinear borders. In one embodiment, the average time for border removal per frame using a single CPU core is around 17 milliseconds or less. The border removal may be parallelized in a multi-core setting to increase the throughput by several folds depending on the number of available cores.

3.1.2 Deep Feature Approximation:

Given the high computational cost of certain deep networks, the total extraction cost for very large-scale problems may be high. As a solution to this challenge, certain embodiments herein provide the option to compute approximate deep features using a less deep network trained to predict the feature space of a substantially deeper convolutional network. This may provide an affordable option for large-scale feature extraction without compromising the accuracy. Feature Extraction/Binarization 314 in FIG. 3 may include any of the following.

Given a large video corpus V, we begin by computing the features of its sub-set V using a very deep (e.g., ResNet network) and a less deep (e.g., AlexNet) networks, producing feature spaces $F^D$ and $F^d$ respectively. Certain embodiments herein find a regression function K that maps $F^d$ to $F^D$ such that the Euclidean distance ($L^2$ distance) between $K(F^d)$ and $F^D$ is minimized. One embodiment herein uses a randomized approximate kernel projection to map $F^d$ to a kernel space $F^K = K(F^d)$. This non-linear projection can be done using a variety of different approximation methods, for example, randomized polynomial kernels. Once in kernel space $F^K$, this problem takes the form of a multi-target linear regression, which can be solved efficiently using the Newton's method by taking only a single pass over the sub-sampled data V to find the resulting weight K×d dimensional matrix W. This matrix W can now be used to find the approximate feature representation of the entire video corpus V by first projecting V to $F^K$ and then right multiplying the projection by W.

In certain embodiments, all operations are based on matrix linear algebra, and can therefore maximally exploit the (e.g., multi-core) processing power of matrix specific processing hardware. To further optimize the projection step, certain embodiments herein use structured random matrices (e.g., a Hadamard transform) to reduce the projection cost from $O(n \cdot d \cdot K)$ to $O(n \cdot d \cdot \log(K))$. In one embodiment, a mean correlation coefficient of 0.89 is achieved between an exact and approximate projected feature. This shows the high accuracy of this approximation. Note that the ability of the regressor to predict the target features improves as the variability of the data decreases in certain embodiments. This observation fits naturally with the clustering-based framework disclosed herein, e.g., the prediction ability of this feature regressor is expected to improve when using individual regression functions for different clusters.

3.1.3 Feature Binarization:

For some applications (e.g., a parsimonious video search), it is useful to use a compact binary feature representation as opposed to using the full (e.g., 32-bit) representation per feature dimension. Feature Extraction/Binarization 314 in FIG. 3 may include any of the following.

A compact encoding scheme may (a) quantize the dense feature space into a number of non-overlapping cells with a unique index (e.g., code) per cell, and (b) given a query, compute hamming distances based on these indices. The choice of hamming distance for large-scale problems may be particularly pertinent given that it can be computed in an extremely fast manner in certain CPUs (e.g., with merely two instructions). More specifically, the Hamming distance between two codes i and j, may be computed by the instruction popcnt(i∧j) in C++, where ∧ is bitwise exclusive OR (XOR) and popcnt is the instruction counting non-zero bits. In one embodiment, this takes about $10^{-9}$ seconds per execution. In certain embodiments, a sparse encoding algorithm is used. For example, given the matrix $X \in \mathbb{R}^{d \times n}$ whose each column is a d-dimensional data point, it may be desirable to learn a projection matrix $R \in \mathbb{R}^{b \times d}$ for producing b-bit binary codes by $B = \text{sign}(RX) \in \{-1, 1\}^{b \times n}$. One way to achieve this is to optimize the following objective function:

$$\min_{R,B} \|RX - B\|_2 \qquad (3)$$

such that $R^T R = I$, and $|R| 0 \le m$ (where T is the transpose, and the $\|\text{value}\|$ indicates the norm (e.g., Euclidean norm) of the value). This problem may then be solved using a variable-splitting optimization algorithm. To preserve the accuracy of the full-form features, it may be important that b should approach and usually be somewhat greater than d. A key reason for the need of high dimensionality of the binarized vectors is the variability in the non-binarized space. One solution to this problem is by clustering the non-binarized feature space and then leaning a different projection matrix R per cluster. This reduces the number of bits required to encode the binary feature vectors by a significant amount without compromising the feature discriminability.

In certain embodiments, it is desirable to scaling-up to a billion-order search problem. Generally, for medium sized problems, binary feature vectors may fit in the system memory (e.g., random-access memory (RAM)) available on commodity machines (for n=1M, and b=1024 bits, the RAM required is around 2.4 GB in one embodiment), and therefore do not require any further indexing procedures. However, for larger-scale problems (e.g., n=10M or more), it may become necessary to partition the binary space further such that only this partition could be stored in the system memory, e.g., where only the relevant part of the binary features could be loaded to do a linear scan over them. Certain embodiments herein use K-Modes clustering to partition the binarized feature space.

3.2 Auditory Feature Extraction

The below discusses extracting features of audio.

Figure 5:
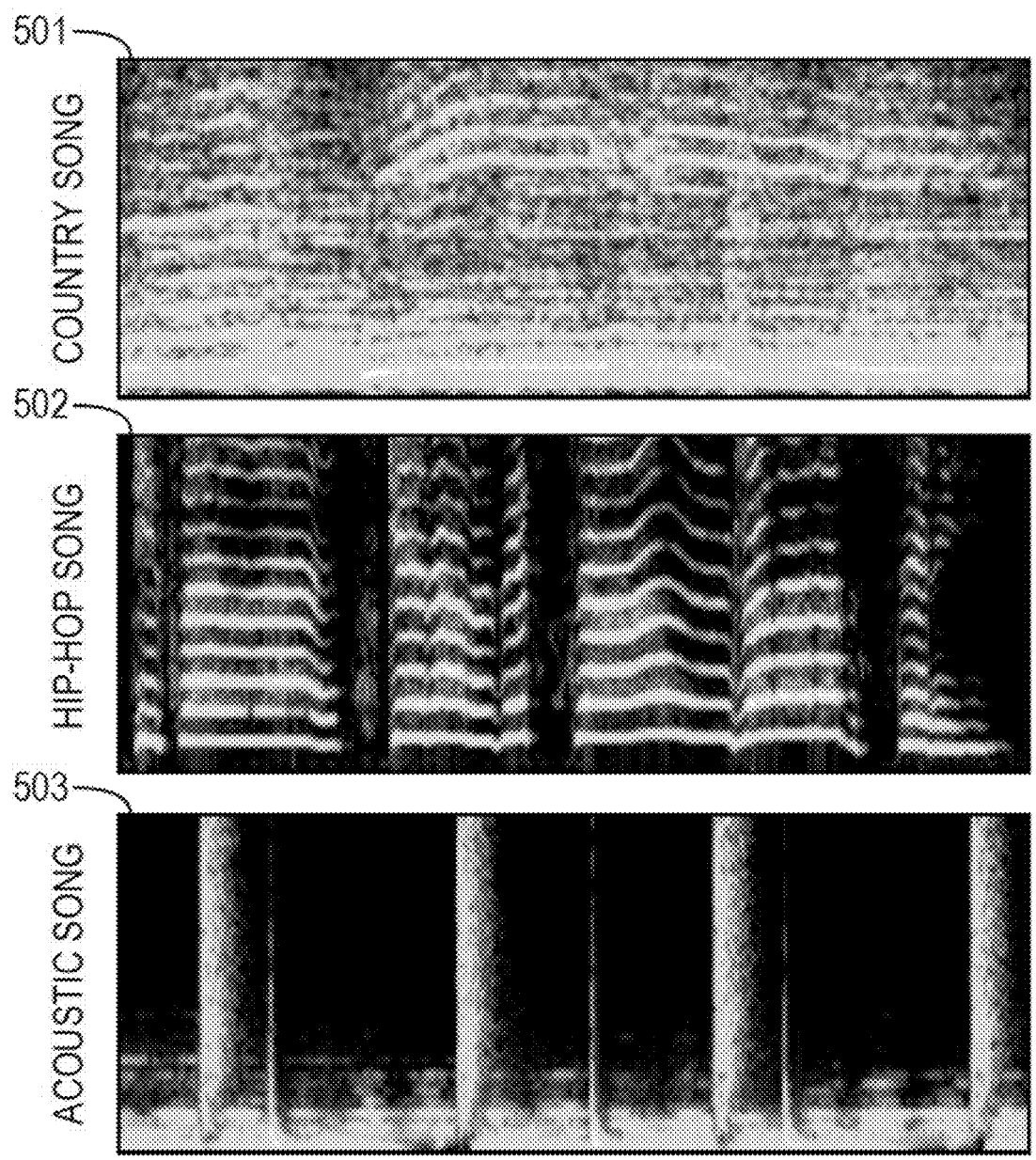
FIG. 5 illustrates image-based representations for the spectra of audio from three different types of videos in a given video corpus according to some embodiments.

3.2.1 Spectrum Computation:

Spectrum computation 316 in FIG. 3 may include any of the following. For each video $v \in V$, extract its audio values a (e.g., audio signal values). Given a time window of size τ, certain embodiments herein extract the τ-length overlapping windows from a to form a matrix A. To reduce spectral leakage, a hamming window is applied to each column of to obtain A^'. This is followed by computing the fast Fourier transform (FFT) of A^' and finding the log of its magnitude to generate A^". Due to the mirroring nature of FFT for real signals, the final spectrum S is found in certain embodiment by removing the second half of the columns from A^'" and flipping the extracted matrix along the y-axis. For the resulting spectrum S, each column characterizes the frequency content of audio values a over a fixed-length time window τ. FIG. 5 illustrates image-based representations for the spectra (501-503) of audio from three different types of videos in a given video corpus according to some embodiments, e.g., where the x-axis is time and the y-axis is the frequency. The visual representation of the frequency spectrum for these videos is noticeably different from each other, e.g., the variance in the country song's frequency spectrum 501, hip-hop song's frequency spectrum 502, and acoustic song's frequency spectrum 503. In one embodiment, the average time to compute the frequency spectrum of one 10 second video using a single CPU core is around 35 milliseconds and the time to extract the audio from the video file of 10 second length is around 55 milliseconds, thus bringing the total time for audio extraction and spectrum computation for a 10 second video clip around 90 milliseconds using a single CPU core in this embodiment. Note that this may be parallelized in a multi-core setting to increase the audio processing throughput by several folds depending on the number of cores available.

3.2.2 Audio Feature Encoding:

Feature encoding 318 in FIG. 3 may include any of the following. While features such as frequency spectra are informative about the characteristics of the input signal, certain embodiments herein utilize those features to form another representation of the input that incorporates the feature distribution of a given dataset to be representationally more informative for that particular dataset. Feature encoding of audio (additionally or alternatively to feature encoding of images or video frames) is to take digital values (e.g., digital signal values) and find data-driven audio representations that are applied in an efficient and scalable manner, e.g., to characterize audio optimized for a given data-set.

Figures 6, 7:
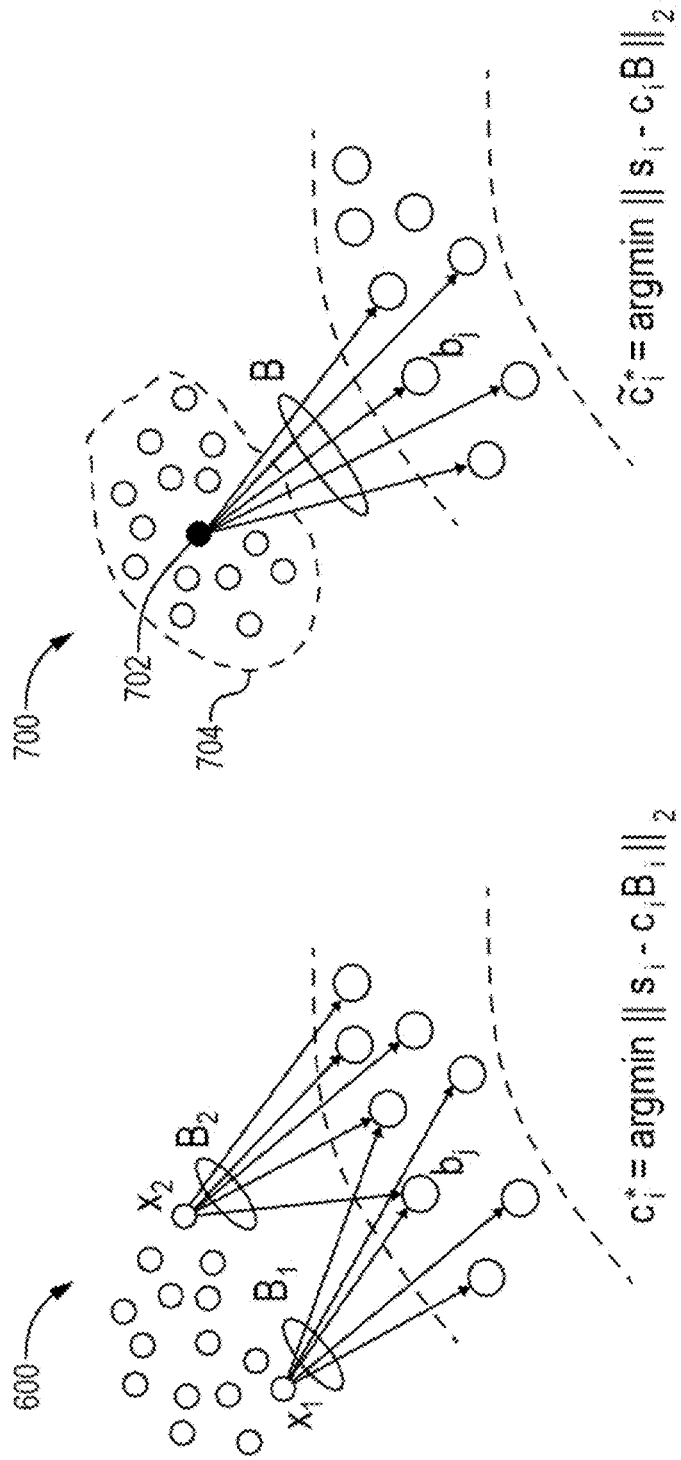
FIG. 6 is a diagram illustrating a first encoding scheme that uses different set of bases nearest to each feature according to some embodiments.
FIG. 7 is a diagram illustrating a second encoding scheme that uses a shared set of bases for a plurality of features according to some embodiments.

As one example, define a spectrum matrix S as a set of N audio (e.g., frequency) features each with D-dimensions, e.g., $S=[s_1, s_2, \ldots, s_N] \in \mathbb{R}^{D \times N}$ Also, define B as a codebook with M code value (e.g., codeword) entries, e.g., $B=[b_1, b_2, \ldots, b_M] \in \mathbb{R}^{D \times M}$. In one embodiment, B is determined by clustering a subset of audio (e.g., frequency spectrum) features, for example, to use B as a set of basis vectors to find a more informative representation of S. One example of this is illustrated in FIG. 6. Denoting this new feature representation as $C=[c_1, c_2, \ldots, c_N]$, the following cost function can be optimized to find the feature encoding of S:

$$\operatorname*{argmin}_{C} \sum_{i=1}^{N} \|s_i - B_i c_i\|^2 \tag{4}$$

where arg min is the argument of the minimum, $B_i \in \mathbb{R}^{D \times K}$ are the K nearest bases to $s_i$. This can be re-written into the normal equation form as:

$$c = (B_i^T B_i)^{-1} B_i^T s_i \tag{5}$$

In one embodiment, the time taken for audio feature encoding for D=300, B=2048 and K=5 for audio for about 10 second video using a single CPU core is about 17.4 milliseconds. In another embodiment, the audio feature encoding is parallelized in a multi-core setting to increase the throughput.

FIG. 6 is a diagram 600 illustrating a first encoding scheme that uses different set of bases nearest to each (e.g., audial) feature according to some embodiments. Utilizing (4) or (5) above for feature $x_1$, the closet set of entries b of codebook B are assigned as a single base ($B_1$) and for feature $x_2$, the closet set of entries b of codebook B are assigned as a different single base ($B_2$). In FIG. 6, the depicted encoding scheme finds different sets of bases nearest to each feature to exactly construct its locally-constrained codes. However, it may be desirable to use an approximate audio encoding, for example, to reduce the computational complexity of the encoding process.

Approximate Audio Encoding: the efficiency of audio encoding (e.g., using 4 or 5 above) can be significantly increased where the same set of bases is used for a cluster of similar (e.g., audio) features $s_i$ as follows:

$$\operatorname*{argmin}_{\tilde{C}} \sum_{i=1}^{N^m} \|s_i^m - B^m \tilde{c}_i\|^2 \tag{6}$$

where $m \in M$ represents the cluster index, $N^m$ is the size of the $m^{th}$ cluster, and $\tilde{c}_i$ is the $i^{th}$ approximate code. This can be written in the normal equation form as:

$$\tilde{c}_i = (B^{mT} B^m)^{-1} B^{mT} S^m \tag{7}$$

where $S^m$ is $D \times N^m$ matrix of features of $m^{th}$ cluster. In one embodiment, forming the right-hand side $B^{mT} S^m$ and solving for $\tilde{c}_i$ is matrix-matrix operations, and can therefore maximally exploit the (e.g., multi-core) processing power of matrix specific processing hardware.

FIG. 7 is a diagram 700 illustrating a second encoding scheme that uses a shared set of bases for a plurality of (e.g., audial) features according to some embodiments. In contrast to the embodiment in FIG. 5, encoding scheme in diagram 700 encodes clusters of features (e.g., feature points) simultaneously by using shared sets of bases nearest to the centroid of the cluster. Utilizing (6) or (7) above for features 704, the closet set of entries b of codebook B for the cluster of features 704 are assigned to a single base (B), e.g., and the centroid 702 of this base used to represent the cluster of features 704.

One benefit of using approximate audio encoding disclosed herein is that it is more robust to the use of approximate nearest neighbor algorithms as compared to an exact encoding methodology. Recall that the assignment operation using nearest neighbors can be one of the most expensive (e.g., in terms of computing resources) in audio indexing, for example, the second most expensive step in audio indexing after encoding in certain embodiments. Bringing down the time required to perform assignment of audial features to their nearest codebook (e.g., dictionary) element using approximate nearest neighbor (e.g., based on k-dimensional (k-d) trees) can further reduce the computational complexity of the indexing process. Certain embodiments of the approximate encoding scheme disclosed herein is more robust to the use of such approximate nearest neighbors than an exact encoding scheme, which enables additional overall efficiency while maintaining robustness.

3.3 K-Means Clustering

Visual feature clustering 320 (e.g., to form clusters of video centroid(s)) and/or audial feature clustering 322 (e.g., to form clusters of audio centroid(s)) in FIG. 3 may include any of the following.

Certain embodiments herein perform K-means clustering on the visual features and/or audial features extracted from videos. In certain embodiments, for visual features, clustering is performed at frame level, for example, with soft-assignment (e.g., by 324 in FIG. 3) of each video performed to the frame-level clusters based on the fraction of frames in a video belonging to a particular frame cluster. In certain embodiments, for auditory features, the clustering is performed directly at video level as auditory feature codes are extracted per video. In certain embodiments, encoding (e.g., as discussed in section 3.2.2) is performed on features to find encoded features, then (e.g., K-means) clustering is performed on the encoded features to form a centroid(s) for the encoded features. In one embodiment, encoding (e.g., as discussed in section 3.2.2) determines a base for each of a subset of features, then (e.g., K-means) clustering is performed on the bases to form a centroid(s) for a shared set of bases.

In certain embodiments, K-Means clustering is used to find the set of codebook elements (e.g., entries) that encode the general characteristics of the various cohesive sub-sets of audio data (e.g., in an unsupervised manner). In one embodiment, these codebook elements are then used to encode the audio features depending on which set of codebook elements is closest to a particular audio feature. In certain embodiments, the audio encoding computed using the encoded codebook elements are more discriminative than simply using spectrum-based audio features. Further details are provided in section 3.2.2 above.

A framework may organize the clusters either in a flat form or into a user-defined hierarchy. Embodiments herein provide the capability to perform both out-of-core clustering running on a single machine, or distributed clustering where the workload is shared among multiple distributed compute nodes.

In one embodiment of distributed clustering, C++ Message Passing Interface (MPI) is used as a distributed computing framework. Features may be partitioned into multiple chunks and fetched from the provider network to multiple machines simultaneously. To minimize the initialization of a K-means algorithm, the initial centroids are randomly selected from given data-points in one embodiment. In certain embodiments, Euclidean ($L^2$) distances are used in K-means clustering. In one embodiment, to compute the Euclidean distances between all the frames and all the centroids efficiently, code for matrix specific processing hardware is utilized to optimize cache usage. In one embodiment, to achieve this with limited memory, multiple mini-batches are used to compute these distances, where the number of features in a mini-batch is kept large enough for efficient use of cache, while being small enough to be contained in the memory of a given machine. In certain embodiments herein, the content indexing system chooses the hardware (e.g., between CPU and GPU) to minimize the financial cost according to the actual run-time and the price of each instance in the provider network. In one embodiment, a content indexing system as disclosed herein is to scale to hundreds of machines, and find hundreds of thousands of clusters in billions of features. For embodiments of large-scale search problems, the disclosed content indexing is to more efficiently find the nearest neighbors of a database for each point in query. Embodiments of the disclosed content indexing decrease the time required to complete distance computation and closest cluster assignment for each iteration of K-means.

3.4 Adjacency Matrix Size Optimization

Centroid adjacency matrix determiner 326 and/or centroid adjacency matrix determiner 328 in FIG. 3 may include any of the following. In certain embodiments herein, the framework uses centroids (e.g., cluster centroids) to approximate the features ascribed to them, and thus it may be imperative that the granularity of the clustering procedure be relatively fine in order to minimize the approximation error. However, the cost of fine cluster granularity results in a potentially high memory foot print of the adjacency matrix A of the discovered centroids in certain embodiments. Recall that the memory footprint of A is quadratic in the number of centroids, and therefore it may be desirable to minimize its memory footprint. Thus, one or more of the following factors may be utilized to minimize the memory footprint of an adjacency matrix.

Exploit Symmetry: in embodiments where adjacency matrix is formed using Euclidian distance, it is therefore symmetric, e.g., its upper triangular half is identical to its lower triangular half. Thus, certain embodiments only store any one of its triangular halves, which results in reduction of memory footprint of A by a factor of about 2.

Use Half-Floats: Given the range of the similarities between centroids (e.g., cluster centroids), it may be desirable to store them in half-precision floating-point (half-floats) format (e.g., which are 16-bits wide, with a one bit sign field, an eight bit exponent field, and a seven bit (explicit, but 8 bits implicit) significand precision field, as opposed to the 32-bit floating-point or 64-bit floating-point formats). This may reduce the memory footprint by another factor of 2 or 4, respectively. Note that while using half-floats for compute purposes may not be desirable, in embodiments herein, these half-floats may be used for storage and not for compute. For example, using half-floats for compute may generally not be preferred in certain CPU architectures that are optimized to process floats at a full-precision (e.g., at least 32 bits wide) floating-point (full-floats) level, and may even reduce the compute efficiency of those CPUs. In certain embodiments, to strike a balance between compute efficiency versus storage size, the values are stored as half-floats for an adjacency matrix, but they are converted into full-floats for each chunk of data (e.g., in a dynamic manner) that is used in compute. In certain embodiments, the dynamic conversion by a CPU from 16-bit half-float format to 32-bit full-float format (e.g., in RAM) is extremely efficient and since the last 16-bits of a 32-bit full-float values do not typically amount to any noticeable difference in the final result in these embodiments, storage of values in a 16-bit half-float format and usage in a 32-bit full-float format are utilized here.

Sparsification: For higher cluster granularity, it may be desirable to mask different centroids from others based on their distances from each other (e.g., by masking out all but the nearest percentage of a proper subset of centroids), for example, to sparsify the cluster graph based on its local structure. This significantly reduces the number of (e.g., floating point) numbers to store, thereby reducing the memory footprint of A by several factors in these embodiments. As one example utilized all the sparsification memory reduction, naively storing the adjacency matrix A for 100,000 discovered clusters (e.g., centroids thereof) using 64-bit floating point numbers is $(8 \times (100{,}000 \times 100{,}000))/(1024 \times 1024 \times 1024) = 74.5$ GB. In comparison, using the aforementioned approach of compressing A with using only the nearest 10% of the clusters, the memory footprint of A equals (2×(100,000×100,000))/(2×10×1024×1024×1024)=0.93 GB, giving a reduction ration of around 80 times.

Figure 8:
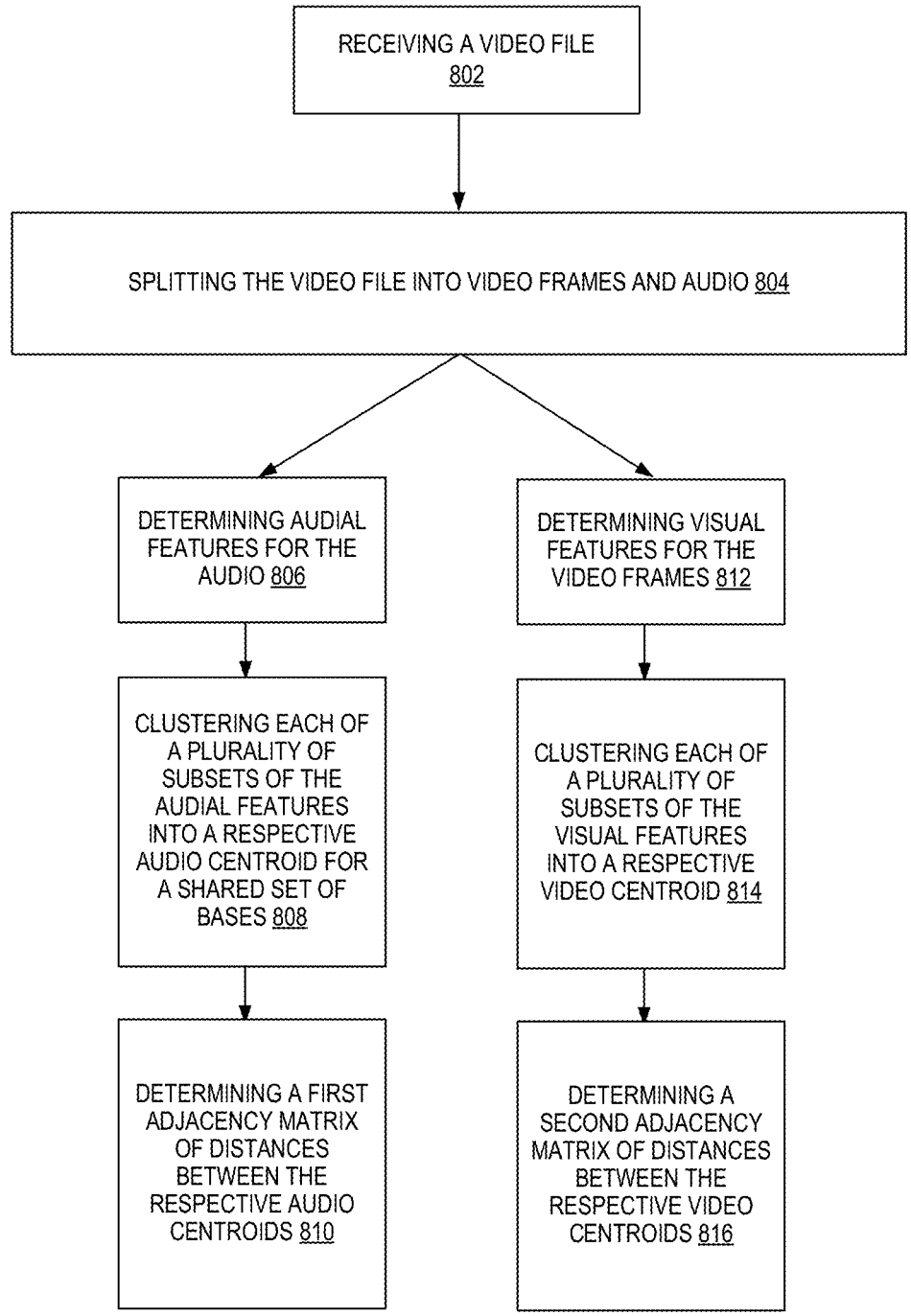
FIG. 8 is a flow diagram illustrating operations of a method for splitting a video file into audio and video frames, and forming a first adjacency matrix of distances between respective audio centroids of the audio and a second adjacency matrix of distances between respective video centroids of the video frames according to some embodiments.

FIG. 8 is a flow diagram 800 illustrating operations of a method for splitting a video file into audio and video frames, and forming a first adjacency matrix of distances between respective audio centroids of the audio and a second adjacency matrix of distances between respective video centroids of the video frames according to some embodiments. Depicted flow diagram 800 includes receiving a video file 802, splitting the video file into video frames and audio 804, determining audial features for the audio 806, clustering each of a plurality of subsets of the audial features into a respective audio centroid for a shared set of bases 808, determining a first adjacency matrix of distances between the respective audio centroids 810, (and, e.g., in parallel with 806, 808, and 810), determining visual features for the video frames 812, clustering each of a plurality of subsets of the visual features into a respective video centroid 814, and determining a second adjacency matrix of distances between the respective video centroids 816.

4. EFFICIENT LABEL ACQUISITION

Certain embodiments herein provide an efficient way to perform label acquisition particularly for the purposes of object detection. A key insight behind the disclosed approach for efficient label acquisition is to remove scene redundancies by means of clustering similar looking frame patches such that the labeler is only required to label a cluster of patches instead of individually labeling (e.g., and viewing) patches. There are multiple ways in which regions can be proposed given a particular frame. Based on empirical results in terms of the efficiency and time required to compute these regions, an embodiment herein uses a class-agnostic single-pass object-vs-non-object deep network pre-trained on an image database to perform the first pass of the region proposal operation. A generous detection confidence-threshold (e.g., 5%) is set at this stage to be over-complete in terms of a generated region-set. Region merging is then performed to remove the regions that are maximally redundant. In one embodiment, this is achieved by using an r-tree based greedy approach to merge regions with intersection-over-union of their area greater than a particular threshold. These merged proposals may then be clustered using the disclosed feature extraction and clustering system into groups of similar looking groups. The labelers may then be presented with an interface showing multiple discovered clustered with the ability to provide labels for each of these clusters. To further verify the goodness of a cluster, a user can use the interface to click on the cluster and look at a sample of the regions from that cluster to ensure that most of the samples indeed look similar and represent the same object.

Given the labels and the most likely estimate of the interesting objects in an environment, embodiments herein fine-tune a pre-trained model. This fine-tuned model may then be used to perform object detection on the training frames in an iterative manner such that at each iteration a user can correct the set of false positives and negatives. This way, the user only has to perform a small fraction of the total work per iteration which results in substantial time savings, e.g., converging to the minima in 2-3 iterations.

5. COMMERCIAL APPLICATIONS

Based on the disclosed content-based indexing framework, the following discusses two different applications thereof.

5.1 User-Generated Social Media Videos

The below discusses three specific use-cases of the disclosed system and methods of content indexing in the context of analyzing short-form videos generated by end-users and posted on various social media platforms.

5.1.1 Search by Content

Embodiments herein enable searching for videos indexed using the disclosed indexing framework with similar auditory or visual content compared to that of a query image or video. The below discussed three types of queries that may be supported for search-by-content use-case:

Image Based Queries: Given a query image provided by the user, certain embodiments begin by computing its visual features using a pre-trained Deep Convolutional Neural Network. A set of K visual centroids (e.g., cluster centroids) nearest to the query feature are then searched. Recall that these visual clusters for a given corpus of videos are pre-computed once off-line in certain embodiments. Videos with the most frames belonging to the set of nearest centroids are retrieved and presented as the result to the search query.

Video Based Queries: For video based queries, the search can be done according to their visual or auditory characteristics.

a-Visual Search: For visual search, certain embodiments begin by computing the visual features for all the frames of the query video (e.g., using a pre-trained Deep Convolutional Neural Network). The set of unique cluster centroids nearest to each of the visual features is then determined. For each video in the nearest cluster-set, the Euclidian distance between the features of the corresponding frames of the query video and cluster videos is then determined in certain embodiments. In embodiments where the visual features of each video frame are represented by its cluster centroid, the distance between the frames of the query video and the frames of videos of the nearest cluster-set can be computed efficiently by simply looking up the corresponding values in the adjacency matrix of centroids. For example, with videos with the smallest mean distance between their corresponding frames and the frames of the query video returned as the final search result.

b-Auditory Search: For auditory search, certain embodiments begin by computing the spectrum of the audio signal of the query video, and then compute its audio features (e.g., based on the disclosure described above in section 3.2). A set of K audio cluster centroids nearest to the query audio feature are then searched. Like visual features, auditory feature clusters for a given corpus of videos are also pre-computed once off-line in certain embodiments. Videos in the nearest cluster-set with auditory features closest to their cluster centroids are retrieved and presented as the search result.

Text Based Queries: Text based search may utilize textual tags being associated to each video in the given video corpus (e.g., a plurality of videos). However, videos (e.g., user-generated videos) found on social media platforms may not have any textual tags provided by the user. Therefore, to enable text based search, certain embodiments herein ensure that the (e.g., all) videos in the corpus have associated textual tags. Two ways of tagging are:

a-Tag Propagation: divide all videos in a given corpus into two sets, first having videos with no tags while the second having videos with one or more tags associated to them. For videos in the first set, the their nearest videos in the second set may be found based on their visual content as described in section 5.1.1. The tags of the nearest neighboring videos in the second set may then be propagated (e.g., copied) to the corresponding videos in the first set. As the tags provided by users for social videos can be conjunctions of words with no spaces in between, certain embodiments break these tags into single words before storing them in the tag database.

b-Classification Based Tag Detection: The quality of the tags obtained by the tag propagation method described can be surprisingly insightful while at the same time being occasionally noisy. To also get a set of predictable but consistent tags for the videos, certain embodiments herein use a model pre-trained on an image database with tags to classify each video-frame in the video corpus. The union of frame-labels for a video gives the label-set for that video.

Both these methods of associating tags to videos may be executed once off-line. Given a text based query, certain embodiments herein find videos that either contain that text or any of its closest synonyms as a tag.

5.1.2 Tag by Content

Given an image or video, certain embodiments herein find their nearest videos in the corpus using the disclosure described in 5.1.1 and 5.1.1 respectively. Certain embodiments find the set of unique tags for these nearest neighbor videos and sort the resulting set of tags based on their frequency of occurrence in the nearest video-set.

5.1.3 Discover by Content

To present the users with the ability to experience different themes present in a video corpus, certain embodiments herein present different clusters discovered based on the visual or auditory content of videos. Given K such clusters, one embodiment herein randomly samples a cluster and presents a fixed set of videos to the users that have most of their frames associated to the picked cluster, e.g., and then sample a different cluster and repeat this process. In certain embodiments, the various clusters are picked such that the diversity of the picked clusters is maximized in a greedy manner, e.g., the next cluster is sampled such that the difference between the current and the next cluster centroids is probabilistically maximized. This may be done using importance sampling over the distribution of distances between the current and all the other cluster centroids.

5.2 Sports Sponsorship Valuation

The disclosed framework herein may be used to detect (e.g., in-field) signage in sports videos to help brands, agencies, and rights holders capture the full media value of sports signage and sponsorship across TV and social media. In certain embodiments, the disclosed framework is used to detect all the (e.g., queried) logos present in the broadcast videos of a certain tournament and/or certain game. In one embodiment, the to-be-searched video files and viewership information of all the video files posted on multiple social media channels (likes, comments, re-tweets, etc.) are obtained, and for each video clip posted on the social media, a parsimonious search is performed over the broadcast footage using our aforementioned video searching. This enables the combination of brand related information with the viewership information to infer the generated media value that a set of logo appearances in a set of broadcast videos produce for the sponsoring brand(s).

6. EXAMPLES

At least some embodiments of the disclosed technologies can be described in view of the following examples:

Example 1. A computer-implemented method comprising:
receiving a video file;
splitting the video file into video frames and audio;
determining frequency spectrum features for the audio;
clustering each of a plurality of subsets of the frequency spectrum features into a respective audio centroid for a shared set of bases;
determining a first adjacency matrix of distances between the respective audio centroids; determining visual features for each frame of the video frames;
clustering each of a plurality of subsets of the visual features into a respective video centroid; and determining a second adjacency matrix of distances between the respective video centroids.

Example 2. The computer-implemented method of example 1, further comprising converting the visual features into a compact binary feature representation, wherein the clustering of each of the plurality of subsets of the visual features comprises clustering each of a plurality of subsets of the compact binary feature representation of the visual features into the respective video centroid.

Example 3. The computer-implemented method of example 1, wherein the clustering of each of the plurality of subsets of the frequency spectrum features into the respective audio centroid for the shared set of bases comprises clustering based on a magnitude of the frequency spectrum features.

Example 4. A computer-implemented method comprising:
receiving a video file;
splitting the video file into video frames and audio;
determining audial features for the audio;
clustering each of a plurality of subsets of the audial features into a respective audio centroid for a shared set of bases;
determining a first adjacency matrix of distances between the respective audio centroids (e.g., the distances between a first video centroid and a second video centroid and a third video centroid);
determining visual features for the video frames;
clustering each of a plurality of subsets of the visual features into a respective video centroid; and
determining a second adjacency matrix of distances between the respective video centroids (e.g., the distances between a first video centroid and a second video centroid and a third video centroid).

Example 5. The computer-implemented method of example 4, further comprising converting the visual features into a compact binary feature representation, wherein the clustering of each of the plurality of subsets of the visual features comprises clustering each of a plurality of subsets of the compact binary feature representation of the visual features into the respective video centroid.

Example 6. The computer-implemented method of example 4, wherein the clustering of each of the plurality of subsets of the audial features into the respective audio centroid for the shared set of bases comprises clustering based on a magnitude of the audial features.

Example 7. The computer-implemented method of example 4, wherein the audial features are frequency spectrum features over a plurality of fixed-length time windows of the audio.

Example 8. The computer-implemented method of example 4, further comprising storing a triangular half of the first adjacency matrix of distances between the respective audio centroids and a triangular half of the second adjacency matrix of distances between the respective video centroids Example 9. The computer-implemented method of example 4, wherein the distances are stored in half-precision floating-point format.

Example 10. The computer-implemented method of example 4, wherein the first adjacency matrix stores the distances between a proper subset of respective audio centroids within a first locality threshold, and the second adjacency matrix stores the distances between a proper subset of respective video centroids within a second locality threshold.

Example 11. The computer-implemented method of example 4, wherein each video frame of the video file is represented by a single video centroid.

Example 12. The computer-implemented method of example 4, further comprising:
receiving a second video file;
splitting the second video file into video frames and audio;
determining audial features for the audio of the second video file;
clustering each of a plurality of subsets of the audial features of the second video file into a respective audio centroid of the second video file for a shared set of bases;
updating the first adjacency matrix with distances between the respective audio centroids of the second video file;
determining visual features for the video frames of the second video file;
clustering each of a plurality of subsets of the visual features of the second video file into a respective video centroid of the second video file; and
updating the second adjacency matrix with distances between the respective video centroids of the second video file.

In one embodiment, example 12 occurs off-line and not incrementally on-line. In one embodiment, examples 13 and/or 14 occur on-line.

Example 13. The computer-implemented method of example 12, further comprising:
determining visual features for each frame of a query video file;
clustering each of a plurality of subsets of the visual features of the query video file into a respective video centroid of the second video file;
comparing the video centroids of the query video to each other to determine the distances therebetween; and
determining a best match between the query video and the video file or the second video file based on the distances between the video centroids of the query video and the second adjacency matrix.

Example 14. The computer-implemented method of example 12, further comprising:
determining audial features of a query video file;
clustering each of a plurality of subsets of the audial features of the query video file into a respective audio centroid of the second video file;
comparing the audio centroids of the query video file to each other to determine the distances therebetween; and
determining a best match between the query video file and the video file or the second video file based on the distances between the audio centroids of the query video file and the second adjacency matrix.

Example 15. A system comprising:
a content data store to store a video file; and
a content indexing service implemented by a one or more electronic devices, the content indexing service including instructions that upon execution cause the one or more electronic devices to:
receive the video file from the content data store,
split the video file into video frames and audio,
determine audial features for the audio,
cluster each of a plurality of subsets of the audial features into a respective audio centroid for a shared set of bases,
determine a first adjacency matrix of distances between the respective audio centroids;
determine visual features for the video frames,
cluster each of a plurality of subsets of the visual features into a respective video centroid, and
determine a second adjacency matrix of distances between the respective video centroids.

Example 16. The system of example 15, wherein the content indexing service further includes instructions that upon execution cause the one or more electronic devices to: convert the visual features into a compact binary feature representation, wherein the cluster of each of the plurality of subsets of the visual features is to cluster each of a plurality of subsets of the compact binary feature representation of the visual features into the respective video centroid.

Example 17. The system of example 15, wherein the cluster of each of the plurality of subsets of the audial features into the respective audio centroid for the shared set of bases is to cluster based on a magnitude of the audial features.

Example 18. The system of example 15, wherein the content indexing service further includes instructions that upon execution cause the one or more electronic devices to: store a triangular half of the first adjacency matrix of distances between the respective audio centroids and a triangular half of the second adjacency matrix of distances between the respective video centroids.

Example 19. The system of example 15, wherein the content indexing service further includes instructions that upon execution cause the one or more electronic devices to:
receive a second video file from the content data store;
split the second video file into video frames and audio;
determine audial features for the audio of the second video file;
cluster each of a plurality of subsets of the audial features of the second video file into a respective audio centroid of the second video file for a shared set of bases;
update the first adjacency matrix with distances between the respective audio centroids of the second video file;
determine visual features for the video frames of the second video file;
cluster each of a plurality of subsets of the visual features of the second video file into a respective video centroid of the second video file; and
update the second adjacency matrix with distances between the respective video centroids of the second video file.

Example 20. The system of example 19, wherein the content indexing service further includes instructions that upon execution cause the one or more electronic devices to:
determine audial features of a query video file;
cluster each of a plurality of subsets of the audial features of the query video file into a respective audio centroid of the second video file;
compare the audio centroids of the query video file to each other to determine the distances therebetween; and
determine a best match between the query video file and the video file or the second video file based on the distances between the audio centroids of the query video file and the second adjacency matrix.

Example 21. A method for content-based multi-media indexing, comprising an efficient compute system that is: (i) streaming in nature, (ii) capable of maximally exploiting distributed heterogeneous compute architectures, and (iii) dynamically adjusting work-loads based on the availability of low-cost spot-instances on the cloud in a robust manner Example 22. The method of example 21, further comprising (i) content-based video indexing, (ii) removing any border contained on the multi-media for filtering out distracting pixels, (iii) extracting features characterizing the visual appearance of the multi-media, (iv) computing the spectrum of the audio of multimedia and extracting its locality-constrained encoding; and (v) clustering the visual and audio features to find groups of multi-media with similar visual and/or auditory content.

Example 23. The method of example 21, further comprising generating computing models for approximate feature extraction to optimize the extraction speed while maintaining feature fidelity.

Example 24. The method of example 21, further comprising computing a binary feature representation of features used to minimize the memory footprint of the features of a multi-media corpus.

Example 25. The method of example 21, further comprising efficiently storing the centroids and the adjacency matrix of the clusters.

Example 26. The method of example 21, further comprising utilizing an active learning framework to enable efficient label acquisition which can be used for feature learning to improve the indexing accuracy.

Example 27. The method of example 21, further comprising searching (e.g., holistic and by-parts), tagging, discovery, and/or curation of videos based upon their content particularly used for social media and sports broadcast videos for sports sponsorship valuation.

Figure 9:
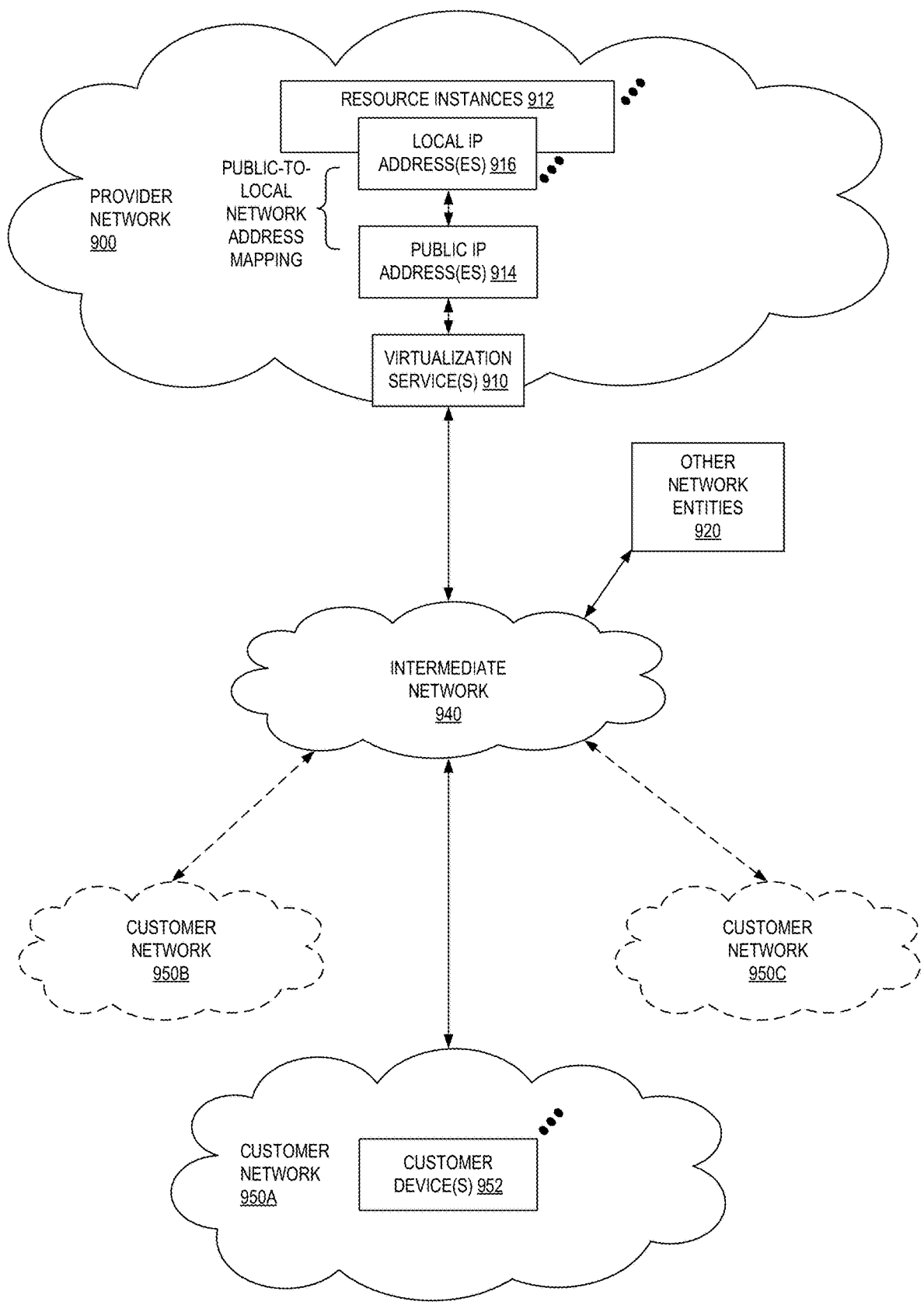
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
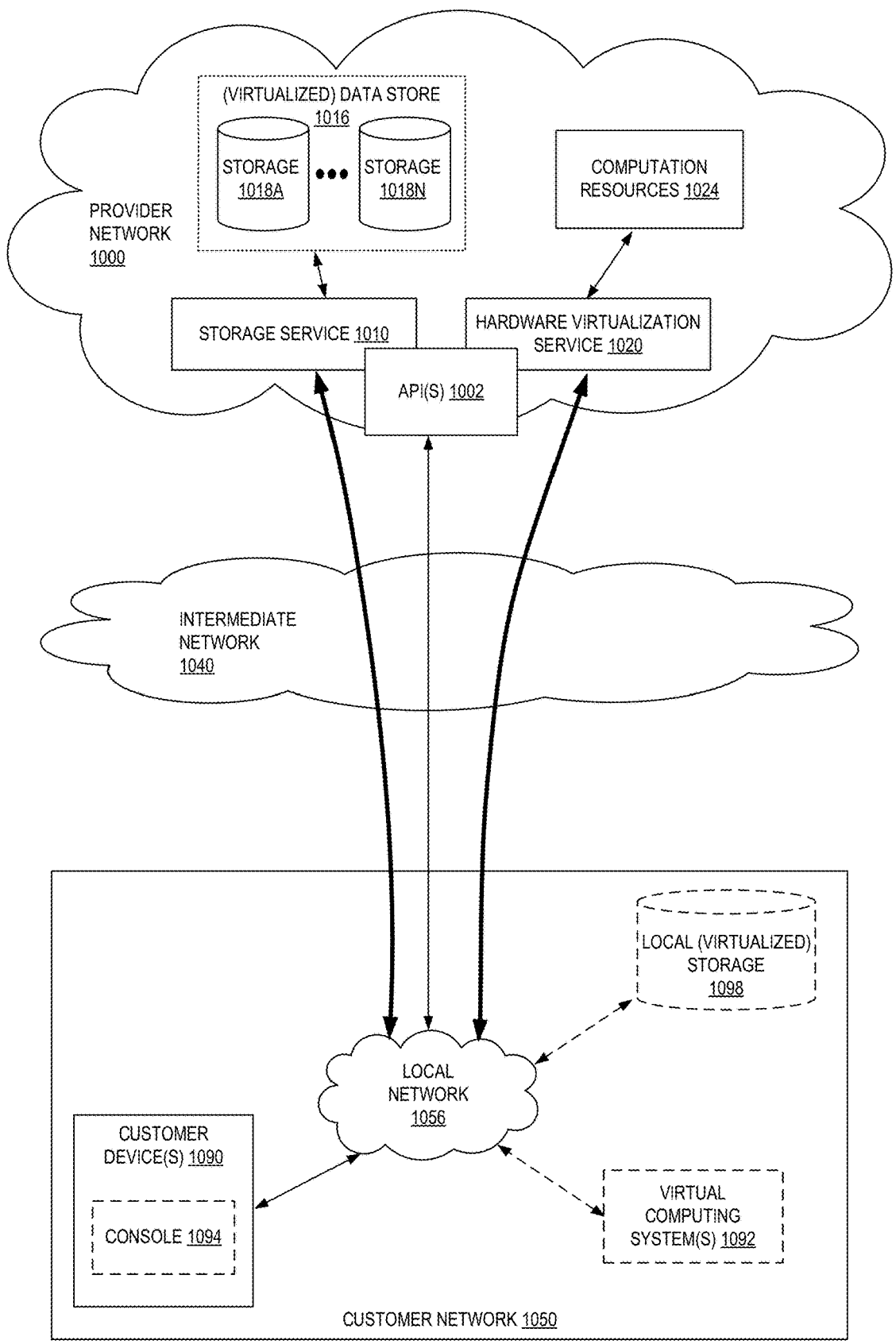
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
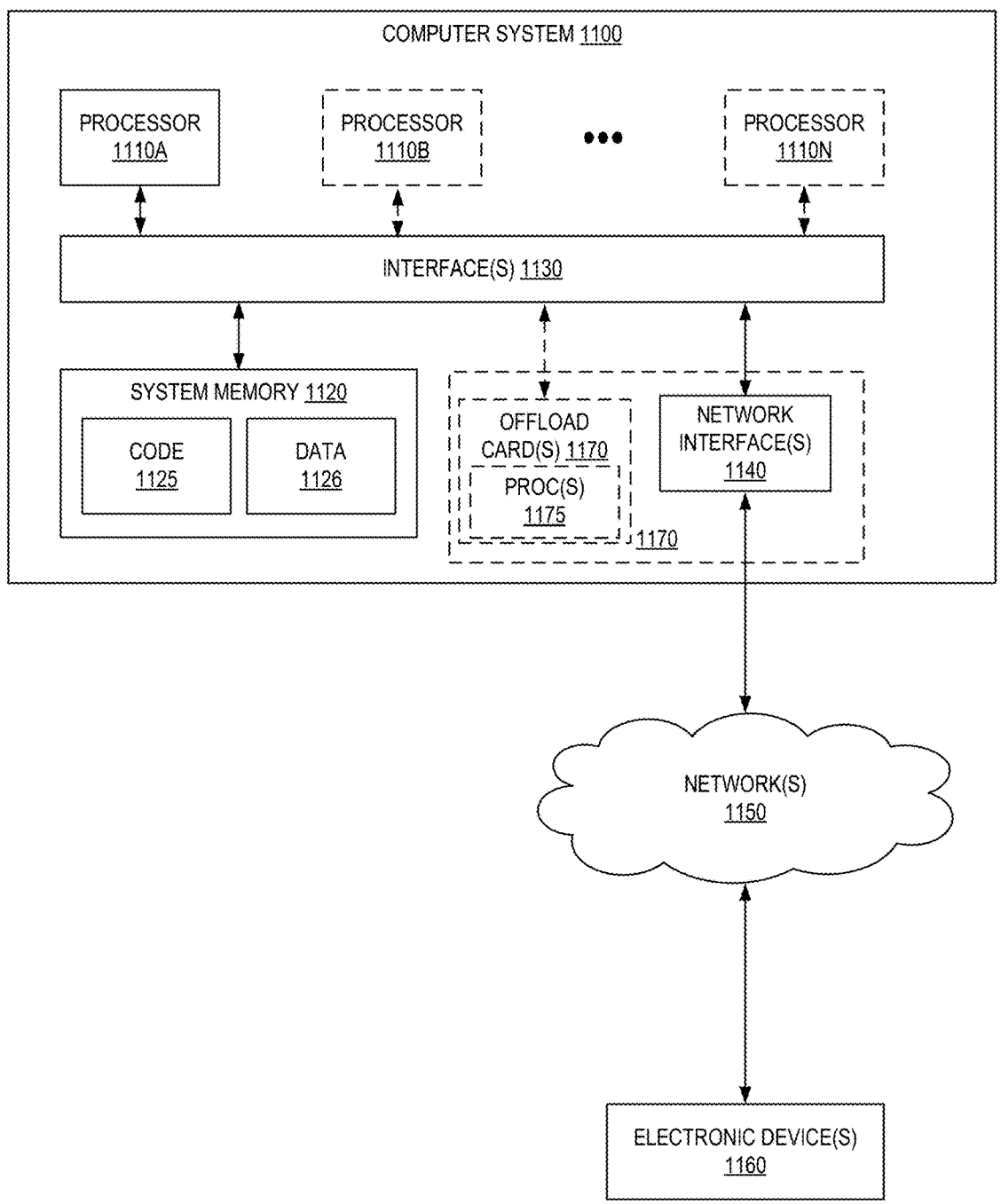
FIG. 11 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
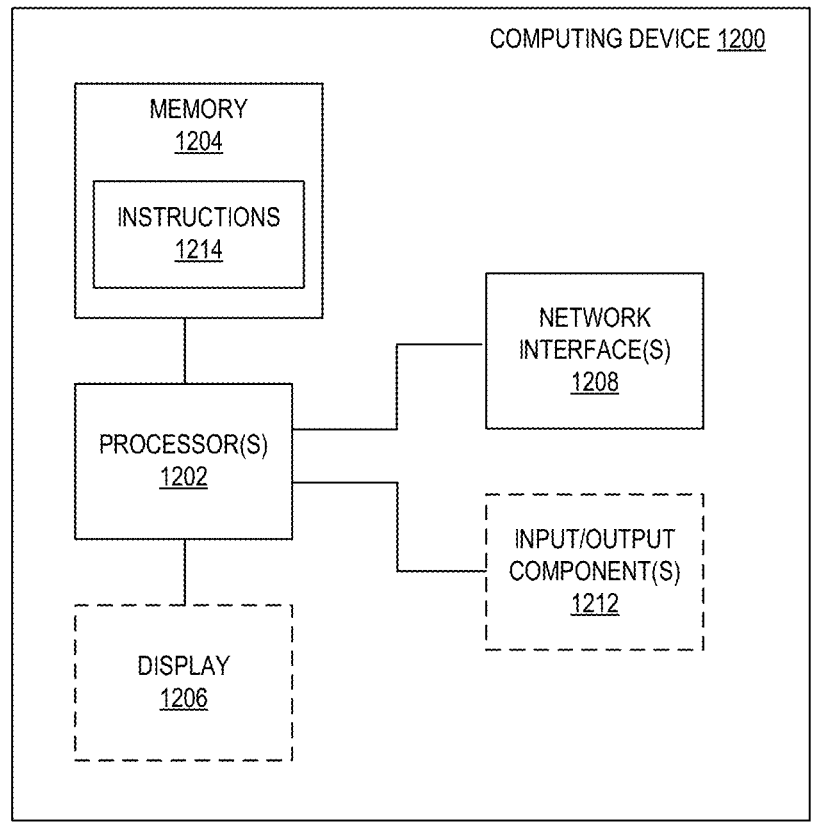
FIG. 12 illustrates a logical arrangement of a set of general components of an exemplary computing device that can be utilized in accordance with various embodiments.

FIG. 12 illustrates a logical arrangement of a set of general components of an example computing device 1200. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (e.g., instructions 1214) and/or data, and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1214) for execution on the set of one or more processors 1202 of that electronic device. One or more parts of various embodiments may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some embodiments include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 13:
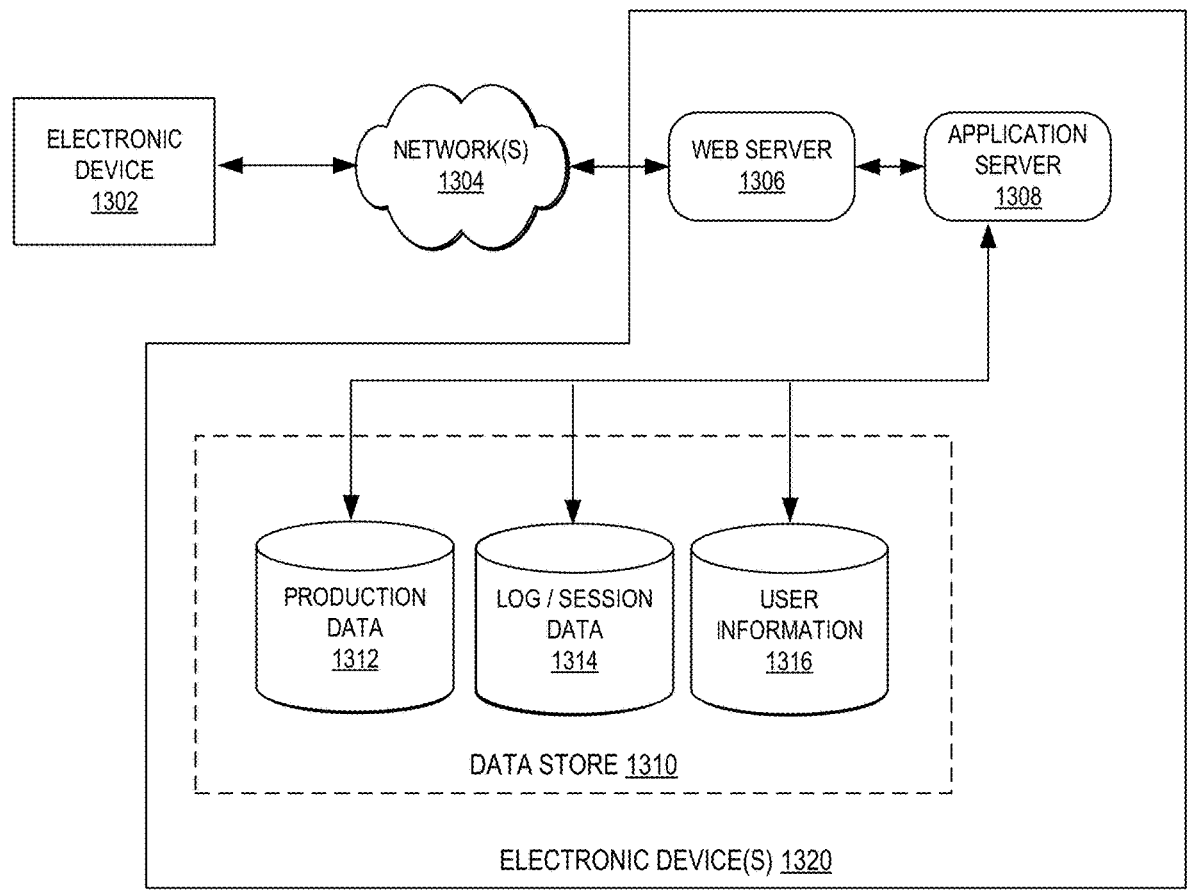
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. For example, in some embodiments messages are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various embodiments. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C#, or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a first video file and a second video file;
splitting the first video file into video frames and audio and the second video file into video frames and audio;
clustering each of a plurality of subsets of frequency spectrum features for the audio of the first video file into a respective audio centroid of the first video file for a shared set of bases;
clustering each of a plurality of subsets of frequency spectrum features for the audio of the second video file into a respective audio centroid of the second video file for a shared set of bases;
determining a first set of distances between the respective audio centroids of the first video file and distances between the respective audio centroids of the second video file;
clustering each of a plurality of subsets of visual features of the first video file into a respective video centroid of the first video file;
clustering each of a plurality of subsets of visual features of the second video file into a respective video centroid of the second video file;

determining a second set of distances between the respective video centroids of the first video file and distances between the respective video centroids of the second video file;

receiving a query video file;

clustering each of a plurality of subsets of visual features of the query video file into a respective video centroid of the query video file;

comparing the video centroids of the query video file to each other to determine distances therebetween;

clustering each of a plurality of subsets of frequency spectrum features of the query video file into a respective audio centroid of the query video file;

comparing the audio centroids of the query video file to each other to determine distances therebetween; and determining a best match for the query video file from the first video file and the second video file based on the distances between the audio centroids of the query video file and the first set of distances, and the distances between the video centroids of the query video file and the second set of distances.

2. The computer-implemented method of claim 1, further comprising converting the visual features into a compact binary feature representation, wherein the clustering of each of the plurality of subsets of the visual features comprises clustering each of a plurality of subsets of the compact binary feature representation of the visual features into the respective video centroid.

3. The computer-implemented method of claim 1, wherein the clustering of each of the plurality of subsets of the frequency spectrum features into the respective audio centroid for the shared set of bases comprises clustering based on a magnitude of the frequency spectrum features.

4. The computer-implemented method of claim 1, wherein the frequency spectrum features are frequency spectrum features over a plurality of fixed-length time windows of the audio.

5. The computer-implemented method of claim 1, wherein the first set of distances is a first adjacency matrix of distances and the second set of distances is a second adjacency matrix of distances, and further comprising only storing a triangular half of the first adjacency matrix of distances and a triangular half of the second adjacency matrix of distances.

6. The computer-implemented method of claim 1, wherein the distances are stored in half-precision floating-point format.

7. The computer-implemented method of claim 1, wherein the first set of distances stores the distances between a proper subset of respective audio centroids within a first locality threshold, and the second set of distances stores the distances between a proper subset of respective video centroids within a second locality threshold.

8. The computer-implemented method of claim 1, wherein each video frame of the query video file is represented by a single video centroid.

9. A system comprising:

a content data store to store a first video file, a second video file, and a query video file; and a content indexing service implemented by a one or more electronic devices, the content indexing service including instructions that upon execution cause the one or more electronic devices to:

receive the first video file and the second video file from the content data store, split the first video file into video frames and audio and the second video file into video frames and audio, cluster each of a plurality of subsets of frequency spectrum features for the audio of the first video file into a respective audio centroid of the first video file for a shared set of bases, determine a first set of distances between the respective audio centroids of the first video file and distances between the respective audio centroids of the second video file, cluster each of a plurality of subsets of visual features of the first video file into a respective video centroid of the first video file, cluster each of a plurality of subsets of visual features of the second video file into a respective video centroid of the second video file, determine a second set of distances between the respective video centroids of the first video file and distances between the respective video centroids of the second video file, receive the query video file from the content data store, cluster each of a plurality of subsets of visual features of the query video file into a respective video centroid of the query video file, compare the video centroids of the query video file to each other to determine distances therebetween, cluster each of a plurality of subsets of frequency spectrum features of the query video file into a respective audio centroid of the query video file, compare the audio centroids of the query video file to each other to determine distances therebetween, and determine a best match for the query video file from the first video file and the second video file based on the distances between the audio centroids of the query video file and the first set of distances, and the distances between the video centroids of the query video file and the second set of distances.

10. The system of claim 9, wherein the content indexing service further includes instructions that upon execution cause the one or more electronic devices to: convert the visual features into a compact binary feature representation, wherein the cluster of each of the plurality of subsets of the visual features is to cluster each of a plurality of subsets of the compact binary feature representation of the visual features into the respective video centroid.

11. The system of claim 9, wherein the cluster of each of the plurality of subsets of the frequency spectrum features into the respective audio centroid for the shared set of bases is to cluster based on a magnitude of the frequency spectrum features.

12. The system of claim 9, wherein the first set of distances is a first adjacency matrix of distances and the second set of distances is a second adjacency matrix of distances, and the content indexing service further includes instructions that upon execution cause the one or more electronic devices to: only store a triangular half of the first adjacency matrix of distances and a triangular half of the second adjacency matrix of distances.

13. The system of claim 9, wherein the frequency spectrum features are frequency spectrum features over a plurality of fixed-length time windows of the audio.

14. The system of claim 9, wherein each video frame of the query video file is represented by a single video centroid.

15. A computer-implemented method comprising:

receiving a query video file;

clustering each of a plurality of subsets of visual features of the query video file into a respective video centroid of the query video file;

comparing the video centroids of the query video file to each other to determine distances therebetween;

clustering each of a plurality of subsets of frequency spectrum features of the query video file into a respective audio centroid of the query video file;

comparing the audio centroids of the query video file to each other to determine distances therebetween; and determining a best match for the query video file from a first video file and a second video file based on the distances between the audio centroids of the query video file and a first set of distances between audio centroids of the first video file and distances between audio centroids of the second video file, and the distances between the video centroids of the query video file and a second set of distances between video centroids of the first video file and distances between video centroids of the second video file.

16. The computer-implemented method of claim 15, further comprising converting the visual features into a compact binary feature representation, wherein the clustering of each of the plurality of subsets of the visual features comprises clustering each of a plurality of subsets of the compact binary feature representation of the visual features into the respective video centroid.

17. The computer-implemented method of claim 15, wherein the clustering of each of the plurality of subsets of the frequency spectrum features into the respective audio centroid comprises clustering based on a magnitude of the frequency spectrum features.

18. The computer-implemented method of claim 15, wherein the frequency spectrum features are frequency spectrum features over a plurality of fixed-length time windows of the audio.

19. The computer-implemented method of claim 15, wherein the first set of distances is a first adjacency matrix of distances and the second set of distances is a second adjacency matrix of distances, and further comprising only storing a triangular half of the first adjacency matrix of distances and a triangular half of the second adjacency matrix of distances.

20. The computer-implemented method of claim 15, wherein the first set of distances stores the distances between a proper subset of respective audio centroids within a first locality threshold, and the second set of distances stores the distances between a proper subset of respective video centroids within a second locality threshold.

* * * * *